(12) United States Patent
Greene et al.

(10) Patent No.: US 10,763,687 B2
(45) Date of Patent: Sep. 1, 2020

(54) METHODS, SYSTEMS, AND APPARATUS FOR WIRELESS RECHARGING OF BATTERY-POWERED DEVICES

(71) Applicant: Powercast Corporation, Pittsburgh, PA (US)

(72) Inventors: Charles E. Greene, Cabot, PA (US); Eric J. Biel, Glenshaw, PA (US); Jason A. Gill, Pittsburgh, PA (US); James C. Losi, Allison Park, PA (US); Mark Brasili, Saxonburg, PA (US)

(73) Assignee: Powercast Corporation, Pittsburgh, PA (US)

( * ) Notice: Subject to any disclaimer, the term of this patent is extended or adjusted under 35 U.S.C. 154(b) by 0 days.

(21) Appl. No.: 16/209,928

(22) Filed: Dec. 4, 2018

(65) Prior Publication Data
US 2019/0181674 A1    Jun. 13, 2019

Related U.S. Application Data

(60) Provisional application No. 62/594,506, filed on Dec. 4, 2017.

(51) Int. Cl.
*H02J 7/00* (2006.01)
*H02J 7/02* (2016.01)
(Continued)

(52) U.S. Cl.
CPC ............ *H02J 7/025* (2013.01); *H02J 7/0029* (2013.01); *H02J 7/0047* (2013.01); *H02J 50/20* (2016.02); *H02J 50/27* (2016.02); *H02J 7/342* (2020.01)

(58) Field of Classification Search
CPC ... A61B 5/002; A61B 5/0022; A61B 5/14539; A61B 5/445; A61B 10/0045;
(Continued)

(56) References Cited

U.S. PATENT DOCUMENTS

| | | | |
|---|---|---|---|
| 5,884,199 A * | 3/1999 | Maki | H04B 1/3805 455/321 |
| 6,297,618 B2 | 10/2001 | Emori et al. | |

(Continued)

FOREIGN PATENT DOCUMENTS

| WO | WO 2006/133204 | 12/2006 |
|---|---|---|
| WO | WO 2019/113127 | 6/2019 |

OTHER PUBLICATIONS

Non-Final Office Action for U.S. Appl. No. 11/447,412, dated Jun. 3, 2008, 6 pages.
(Continued)

*Primary Examiner* — Daniel Previl
(74) *Attorney, Agent, or Firm* — Cooley LLP

(57) ABSTRACT

In some embodiments, an apparatus includes an antenna, an energy storage device, a receiver, and an indicator assembly. The receiver may be coupled to the antenna and the energy storage device. The receiver may be configured to receive wireless energy via the antenna such that an energy storage level of the energy storage device is increased. The indicator assembly may be coupled to the receiver and may be configured, in response to the receiver receiving the wireless energy, to provide an indication based, at least in part, on a characteristic of the wireless energy.

24 Claims, 10 Drawing Sheets

(51) Int. Cl.
*H02J 50/27* (2016.01)
*H02J 50/20* (2016.01)
*H02J 7/34* (2006.01)

(58) Field of Classification Search
CPC ............ A61B 5/0015; A61F 13/00051; A61M 1/0088; A61M 1/0025; A61M 2205/3344; A61M 2205/3382; A61M 2205/3553; A61M 2205/3592; A61M 2230/50; G06F 19/00; G16H 40/67; G16H 40/63; H02J 7/025; H02J 50/20; H02J 50/27; H02J 7/0029; H02J 7/0047; H02J 17/00; H02J 7/0054; H04Q 9/00; G01N 33/00; F24F 11/30; F24F 11/52; F24F 11/58; F24F 11/62; F24F 11/63; F24F 2110/10; F24F 2130/00; F24F 2130/10; G05B 19/048; G05B 2219/2614; G05D 23/1917
USPC ... 340/636.2, 636.19, 636.1, 636.11–636.13, 340/658, 660, 683, 691.6, 692, 3.1, 340/825.24

See application file for complete search history.

(56) References Cited

U.S. PATENT DOCUMENTS

| | | | |
|---|---|---|---|
| 6,447,448 | B1 | 9/2002 | Ishikawa et al. |
| 6,615,074 | B2 | 9/2003 | Mickle et al. |
| 6,784,358 | B2 | 8/2004 | Kukulka |
| 6,835,501 | B2 | 12/2004 | Morishita et al. |
| 6,836,095 | B2 | 12/2004 | Fogg |
| 6,858,970 | B2 | 2/2005 | Malkin et al. |
| 6,882,128 | B1 | 4/2005 | Rahmel et al. |
| 6,894,467 | B2 | 5/2005 | Pons et al. |
| 7,256,695 | B2 | 8/2007 | Hamel et al. |
| 7,268,517 | B2 | 9/2007 | Rahmel et al. |
| 7,561,866 | B2 | 7/2009 | Oliver et al. |
| 7,956,572 | B2 | 6/2011 | Zane et al. |
| 8,621,245 | B2 | 12/2013 | Shearer et al. |
| 9,021,277 | B2 | 4/2015 | Shearer et al. |
| 10,284,019 | B2 | 5/2019 | Shearer et al. |
| 2002/0072784 | A1 | 6/2002 | Sheppard, Jr. et al. |
| 2003/0032993 | A1 | 2/2003 | Mickle et al. |
| 2004/0150529 | A1 | 8/2004 | Benoit et al. |
| 2004/0212479 | A1* | 10/2004 | Gilbert ............... G05B 23/0205 340/10.34 |
| 2004/0259604 | A1 | 12/2004 | Mickle et al. |
| 2005/0052287 | A1 | 3/2005 | Whitesmith |
| 2005/0240778 | A1 | 10/2005 | Saito |
| 2006/0113955 | A1* | 6/2006 | Nunally ............... H02J 50/90 320/108 |
| 2006/0281435 | A1* | 12/2006 | Shearer ............... G06K 19/0707 455/343.1 |
| 2009/0294531 | A1* | 12/2009 | Kantrowitz ...... G06K 19/06009 235/385 |
| 2010/0127660 | A1 | 5/2010 | Cook et al. |
| 2010/0271994 | A1* | 10/2010 | Wolfe ............... H04W 52/0264 370/311 |
| 2014/0011543 | A1* | 1/2014 | Li ..................... H04W 52/0206 455/561 |
| 2015/0128733 | A1* | 5/2015 | Taylor ..................... H02J 17/00 73/865.8 |
| 2015/0236551 | A1 | 8/2015 | Shearer et al. |
| 2016/0013677 | A1 | 1/2016 | Bell et al. |
| 2017/0279295 | A1 | 9/2017 | Wojcik |
| 2018/0201148 | A1* | 7/2018 | Donnelly ........... G06Q 30/0283 |

OTHER PUBLICATIONS

Final Office Action for U.S. Appl. No. 11/447,412, dated Jan. 8, 2009, 10 pages.
Office Action for U.S. Appl. No. 12/499,618, dated Jun. 22, 2011, 6 pages.
Office Action for U.S. Appl. No. 12/499,618, dated Apr. 19, 2012, 7 pages.
Final Office Action for U.S. Appl. No. 12/499,618, dated Feb. 21, 2013, 8 pages.
Office Action for U.S. Appl. No. 14/143,334, dated Mar. 28, 2014, 7 pages.
International Search Report and Written Opinion for International Application No. PCT/US06/21940, dated Sep. 25, 2007, 6 pages.
Examination Report for Australian Application No. 2006255054, dated Nov. 27, 2009, 2 pages.
Examination Report for Australian Application No. 2006255054, dated Jul. 7, 2011, 3 pages.
Office Action for Chinese Application No. 200680020092.3, dated Sep. 7, 2009, 5 pages.
Examination Report for Singapore Application No. 200718208-2, dated Sep. 28, 2009, 6 pages.
Office Action for Mexican Patent Application No. MX/a/2007/015229, dated Mar. 4, 2010, 2 pages.
European Search Report for European Patent Application No. 06772310.6, dated Jul. 27, 2011, 7 pages.
Non-Final Office Action issued by the United States Patent and Trademark Office for U.S. Appl. No. 14/697,053, dated Jun. 15, 2017, 9 pages.
Non-Final Office Action issued by the United States Patent and Trademark Office for U.S. Appl. No. 14/697,053, dated Apr. 5, 2018, 8 pages.
International Search Report and Written Opinion for International Application No. PCT/US2018/063933, dated Jul. 18, 2019, 11 pages.

* cited by examiner

METHODS, SYSTEMS, AND APPARATUS FOR WIRELESS RECHARGING OF BATTERY-POWERED DEVICES

CROSS-REFERENCE TO RELATED APPLICATIONS

This application claims priority to U.S. Provisional Application No. 62/594,506, entitled "Methods, Systems, and Apparatus for Wireless Recharging of Battery-Powered Devices," filed Dec. 4, 2017, the disclosure of which is incorporated by reference herein in its entirety.

BACKGROUND

Some embodiments described herein relate generally to systems, methods, and apparatus for wirelessly transmitting power.

As processor capabilities have expanded and power requirements have decreased, the number of devices operating independent of wires or power cords has increased. These "untethered" devices (also referred to as "wireless devices") include, for example, cell phones, wireless headphones, wireless keyboards, smartwatches, building sensors, and RFID tags. These untethered devices, however, are often limited by their portable power sources (e.g., the life and/or capacity of their batteries). Furthermore, recharging the portable power sources of many untethered devices often requires the untethered devices to be temporarily coupled via a wire (e.g., a power cord) to an external power source, such as a wall outlet. Thus, during a recharging period, the untethered devices have limited mobility relative to the external power source. Additionally, a user of an untethered device typically manually initiates and concludes a recharging process of the untethered device, which may be inconvenient.

Thus, a need exists for systems, methods, and apparatus that allow for convenient wireless powering of wireless devices.

SUMMARY

In some embodiments, an apparatus includes an antenna, an energy storage device, a receiver, and an indicator assembly. The receiver is coupled to the antenna and the energy storage device. The receiver is configured to receive wireless energy via the antenna such that an energy storage level of the energy storage device is increased. The indicator assembly is coupled to the receiver and configured, in response to the receiver receiving the wireless energy, to provide an indication based, at least in part, on a characteristic of the wireless energy.

DETAILED DESCRIPTION

Figure 1:
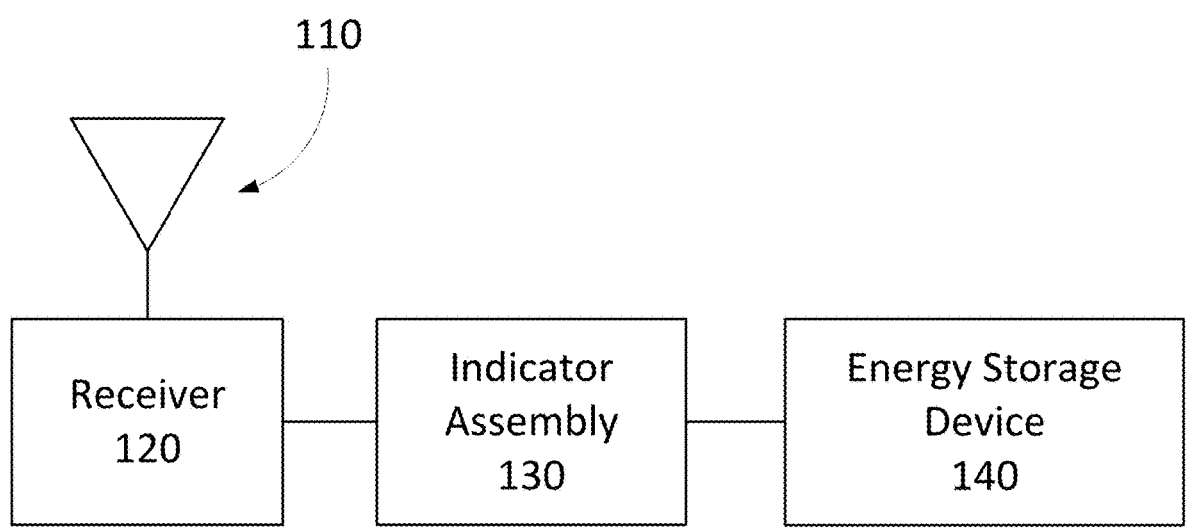
FIG. 1 is a schematic illustration of a system for receiving and storing wirelessly transferred power, according to an embodiment.

In some embodiments, an apparatus includes an antenna, an energy storage device, a receiver, and an indicator assembly. The receiver is coupled to the antenna and the energy storage device. The receiver is configured to receive wireless energy via the antenna such that an energy storage level of the energy storage device is increased. The indicator assembly is coupled to the receiver and configured, in response to the receiver receiving the wireless energy, to provide an indication based, at least in part, on a characteristic of the wireless energy.

In some embodiments, an apparatus includes an antenna, a receiver coupled to the antenna, and a first energy storage device coupled to the receiver. The first energy storage device is configured to increase an energy storage level of the first energy storage device to a first threshold energy storage level when a first wireless energy is received by the receiver. The wireless first energy may have a current, the first threshold energy storage level being below an energy storage capacity of the first energy storage device. The first energy storage device may be configured to provide power to a second energy storage device having a second energy storage capacity greater than the first energy storage capacity by sending a second energy to the second energy storage device, the second energy having a current greater than the current of the first wireless energy.

In some embodiments, an apparatus includes an energy storage device, an RF-to-DC converter, an antenna, and a feedpoint. The antenna is configured to provide power to the energy storage device such that an energy storage level of the energy storage device increases when the energy storage level of the energy storage device is below an energy storage capacity of the energy storage device. The antenna includes a flexible first arcuate metal portion having a first radius, a flexible second arcuate metal portion having a second radius smaller than the first radius, and a plurality of spacers. Each spacer from the plurality of spacers is coupled to the first arcuate metal portion and the second arcuate metal portion such that a portion of the first arcuate metal portion coupled to that spacer and a portion of the second arcuate metal portion coupled to that spacer are spaced apart by a predetermined distance. The feedpoint couples the first arcuate metal portion to the second arcuate metal portion and may be configured to operatively couple the antenna to the RF-to-DC converter.

In some embodiments, an apparatus includes a housing, an antenna, and an energy storage device. The antenna and the energy storage device is disposed within the housing.

The antenna includes an antenna portion and a reflector. The reflector is electrically isolated from the antenna portion. The energy storage device is disposed within the housing and configured such that an energy storage level of the energy storage device can increase in response to the antenna receiving wireless energy.

FIG. 1 is a schematic illustration of a system 100. The system 100 may be, for example, a wireless device (e.g., an end device such as a mobile phone such as a smartphone, a wireless game controller, a smartwatch, or wireless headphones). In some implementations, the system 100 may be, for example, an intermediary device coupleable to a wireless end device such that power collected by the system 100 may be transferred to an energy storage device of the wireless end device. As shown in FIG. 1, the system 100 includes an antenna 110, a receiver 120, an indicator assembly 130, and an energy storage device 140. The receiver 120 may be coupled to the antenna 110 and the energy storage device 140. The indicator assembly 130 may be coupled to the receiver 120 and/or the energy storage device 140. In some implementations, the energy storage device 140 may be coupled to the receiver 120 via the indicator assembly 130. The receiver 120 may receive wireless energy via the antenna 110 such that an energy storage level of the energy storage device 140 is increased. The wireless energy may be, for example, radio frequency (RF) energy. The wireless energy may have a power level. In some implementations, the wireless energy may be included in a wireless signal containing, for example, a beacon or data. The indicator assembly 130 may, in response to the receiver 120 receiving the wireless energy, provide an indication based, at least in part, on a characteristic of the wireless energy. In some implementations, the energy storage device 140 is a first energy storage device, and the system 100 optionally includes and/or is coupled to a second energy storage device (not shown). In some implementations, the antenna 110 and/or the receiver 120 form at least a portion of an energy harvesting assembly.

The energy storage device 140, and any of the energy storage devices described herein, may be any suitable type of energy storage device. In some implementations, the energy storage device 140, and any of the energy storage devices described herein, may include a typical rechargeable chemical battery. In some implementations, the energy storage device 140, and any of the energy storage devices described herein, may include a capacitor that can store energy.

In some implementations, the indicator assembly 130 may determine whether the wireless energy received by the receiver 120 is capable of increasing the energy storage level of the energy storage device 140. For example, the indicator assembly 130 may determine whether a characteristic of the received wireless energy is within a range that would be able to increase the energy storage level of the energy storage device 140 (e.g., above a threshold strength or current level of the energy storage device 140). The characteristic may be, for example, a current level, a received signal strength indicator (RSSI), or any other suitable characteristic. The indicator assembly 130 may then provide an indication based, at least in part, on a determination that the wireless energy is capable of increasing the energy storage level of the energy storage device 140.

In some implementations, the indicator assembly 130 may determine whether the characteristic of the wireless energy is within a predetermined range or above a predetermined threshold. The indicator assembly 130 may then provide an indication based, at least in part, on a determination that the characteristic of the wireless energy is within the predetermined range or above a predetermined threshold. For example, in some implementations, the indicator assembly 130 may determine whether a current level of the wireless energy is within a predetermined range or above a predetermined threshold. The indicator assembly 130 may include a current sense amplifier. In some implementations, the predetermined range or predetermined threshold may correspond to a current level required to charge the energy storage device 140. In some implementations, the predetermined range or predetermined threshold may correspond to a current level used to charge the energy storage device 140 in a particular length of time or within a range of lengths of time. In some implementations, the predetermined range or predetermined threshold may correspond to a distance range from a transmitter transmitting the wireless energy. The indication provided by the indicator assembly 130 may then be based, at least in part, on a determination that the current level of the wireless energy is within the predetermined range or above a predetermined threshold. The indication may alert the user that the system 100 is within a particular charging distance range or zone of the transmitter.

In some implementations, the indicator assembly 130 may determine whether a received signal strength of the wireless energy received by the receiver 120 is within a predetermined range or above a predetermined threshold. In some implementations, the indicator assembly 130 may determine a received signal strength of the wireless energy (e.g., an estimated power level of the wireless energy received by the receiver 120) and to determine whether the received signal strength of the wireless energy is within a predetermined range or above a predetermined threshold in addition or alternatively to determining a current level of the wireless energy. In some implementations, the predetermined range or predetermined threshold may correspond to a received signal strength used to charge the energy storage device 140 in a particular length of time or within a range of lengths of time. In response to determining that the received signal strength of the wireless energy is within the predetermined range or above predetermined threshold, the indicator assembly may provide an indication based at least in part on the determination that the received signal strength of the wireless energy is within the predetermined range or above the predetermined threshold. In some implementations, the predetermined range or predetermined threshold may correspond to a distance range from a transmitter transmitting the wireless energy. The indication may alert the user that the system 100 is within a particular charging distance range or zone of the transmitter.

In some implementations, the indicator assembly 130 may provide any suitable number of indications indicating various conditions of the system 100. For example, the indicator assembly 130 may provide a number of distinct indications. For example, the indicator assembly 130 may provide a first indication corresponding to a first condition of the system 100 and/or a first characteristic of the wireless energy, a second indication corresponding to a second condition of the system 100 and/or a second characteristic of the wireless energy, and a third indication corresponding to a third condition of the system 100 and/or a third characteristic of the wireless energy.

In some implementations, the first indication may represent a first predetermined range of the current level or received signal strength of received wireless energy corresponding to a first distance range from a transmitter transmitting the wireless energy. The second indication may represent a second predetermined range of the current level or received signal strength of received wireless energy corresponding to a second distance range from a transmitter transmitting the wireless energy. The third indication may represent a third predetermined range of the current level or received signal strength of received wireless energy corresponding to a third distance range from a transmitter transmitting the wireless energy. Thus, the indicator assembly 130 may determine whether a characteristic of received wireless energy (e.g., a current level or received signal strength) is within a first predetermined range, a second predetermined range, or a third predetermined range. In response to determining that the characteristic of received wireless energy is within one of the first predetermined range, the second predetermined range, or the third predetermined range, the indicator assembly 130 may provide an indication to the user of the determination that the characteristic is within the first, second, or third predetermined range. If the characteristic of the wireless energy changes (e.g., if the system 100 is moved closer to a transmitter), the determination of whether the characteristic is within the first predetermined range, the second predetermined range, or the third predetermined range may change. In response to the indicator assembly 130 determining that the determination has changed (e.g., the characteristic was within the first predetermined range but is now in the second predetermined range), the indicator assembly 130 may provide an indication of the change or an indication of the new condition. For example, the indicator assembly 130 may provide an indication signaling to a user that a rate of recharge of the energy storage device 140 is increased compared to a rate of recharge indicated by a previous indication, which may be due to moving the system 100 from a first zone relative to a transmitter to a second zone closer to the transmitter.

The indicator assembly 130 may include or be coupled to any suitable components configured to provide an indication. For example, the indicator assembly 130 may include or be coupled to a general processor, an application specific processor, and/or a circuit. In some implementations, a processor associated with an end device (e.g., a smartphone, a wireless game controller, or wireless headphones) may run instructions such that the end device may first receive a signal including a characteristic of wireless energy received by the receiver 120 and/or a characteristic of the energy storage device 140 (e.g., an indication of charging effectiveness such as the current level or RSSI of the wireless energy received by the receiver 120). The processor may compare the received characteristic to a look up table stored in a memory (e.g., an EPROM). An output instruction correlating to the characteristic may be identified based on the look up table. The output instruction may then be sent to an output device of the indicator assembly 130, which may include, for example, a speaker, at least one light-emitting diode, and/or a haptic actuator. The output device of the indicator assembly 130 may be included in the system 100 or in an end device coupleable to the system 100.

In some implementations, the indication provided by the indicator assembly 130 may include one or more audible indications provided via a speaker of the indicator assembly 130. The indicator assembly 130 may produce a number of distinct sounds to indicate various charging conditions of the system 100. For example, the indicator assembly 130 may produce a sound having a first pitch to indicate that the system 100 has entered a charging zone of a transmitter and a sound having a second pitch different from the first pitch to indicate that the system 100 has exited a charging zone of a transmitter. In some implementations, the indicator assembly 130 may play a unique sound or tune based on a determination of which predetermined range the characteristic of the received wireless energy falls within. Thus, the indicator assembly 130 may play a first sound or tune when the system 100 is within a first charging zone of a transmitter, a second sound or tune when the system 100 is within a second charging zone of the transmitter, and a third sound or tune when the system 100 is within a third charging zone of the transmitter.

In some implementations, as the device 100 is moved closer to a transmitter from which the device 100 is receiving wireless energy, the indication may change. In some implementations, the indicator assembly 130 may increase a frequency of a sound to indicate that a rate of recharging the energy storage device 140 has increased based on a characteristic of the energy received by the receiver 120. In some implementations, the indicator assembly 130 may produce a particular audible indication when charging ends (e.g., because the system 100 has been moved outside of a charging range of the transmitter or because the energy storage level of the energy storage device 140 is above a threshold energy storage level and/or equal to the energy storage capacity of the energy storage device 140).

As an example, the following audible indication scheme may be implemented using the indicator assembly 130:

| Charging Rate | Sound Emitted |
|---|---|
| Fast | Beep Sound 1 |
| Medium | Beep Sound 2 |
| Slow | Beep Sound 3 |
| Off | Beep Sound 4 |

In some implementations, the indication provided by the indicator assembly 130 may include a visual indication. For example, the indicator assembly 130 may include at least one light emitting diode. The indicator assembly 130 may illuminate the at least one light emitting diode to indicate a particular condition of the system 100 or a characteristic of the wireless energy received by the receiver 120. Different colors, illumination intensities, and/or rates of flashing of the one or more light emitting diodes may be used to indicate, for example, that the energy storage device 140 has a particular charging rate based on the wireless energy being received by the receiver 120, that the system 100 is within a particular charging zone or range from a transmitter, or that a characteristic (e.g., current level or RSSI) of the wireless energy received by the receiver 120 is within a pre-determined range or above a pre-determined threshold. In some implementations, the indicator assembly 130 may cease illumination of the at least one light emitting diodes or cause the at least one light emitting diodes to illuminate a different color when charging ends (e.g., because the system 100 has been moved outside of a charging range of the transmitter or because the energy storage level of the energy storage device 140 is equal to the energy storage capacity of the energy storage device 140).

As an example, the following visual indication scheme may be implemented using the indicator assembly 130:

| Charging Rate | LED Color |
|---|---|
| Fast | Slow Flashing Green |
| Medium | Slow Flashing Yellow |
| Slow | Slow Flashing Orange |
| Off | Solid Red for 5 seconds then off |

As another example, the following visual indication scheme may be implemented using the indicator assembly 130:

| Charging Rate | LED Color |
|---|---|
| Fast | Solid Bright Green |
| Medium | Solid Dim Green |
| Slow | Solid Yellow |
| Off | Flashing Red for 5 seconds then off |

In some implementations, the indication provided by the indicator assembly 130 may include a haptic indication. The indication assembly 130 may include a haptic actuator that can vibrate the system 100 or a portion of the system 100 in response to making a determination regarding a particular characteristic of received wireless energy or a particular characteristic of the energy storage device 140. For example, the haptic actuator may actuate to indicate that the receiver 120 has received wireless energy capable of charging the energy storage device 140 (e.g., having a sufficiently high current or RSSI). Thus, actuation of the haptic actuator of the indication assembly 130 may indicate to a user that the system 100 is disposed within a charging zone of a transmitter. The haptic actuator may also actuate to indicate that the receiver 120 is no longer receiving wireless energy capable of charging the energy storage device 140, thus indicating to the user that the system 100 is no longer disposed within the charging zone of the transmitter. In some embodiments, the indication assembly 130 may cause the haptic actuator to produce the same or different vibrational patterns (e.g., different intensities and/or lengths) corresponding to entering or exiting the charging zone of the transmitter.

In some implementations, the indicator assembly 130 may actuate the haptic actuator such that a user experiences a different vibrational pattern corresponding to different ranges of charging speed (e.g., corresponding to different current levels of the wireless energy received by the receiver 120). For example, the haptic actuator may be actuated with different intensities or lengths. In some implementations, the indicator assembly 130 may actuate the haptic actuator (e.g., according to a particular pattern) when charging ends (e.g., because the system 100 has been moved outside of a charging range of the transmitter or because the energy storage level of the energy storage device 140 is equal to the energy storage capacity of the energy storage device 140).

As an example, the following haptic indication scheme may be implemented using the indicator assembly 130:

| Charging Rate | Vibration Scheme |
|---|---|
| Fast | 3 short vibrations |
| Medium | 2 short vibrations |
| Slow | 1 short vibration |
| Off | 1 long vibration |

In some implementations, the indicator assembly 130 may produce multiple indicators to indicate a particular condition of the system 100 or a characteristic of the wireless energy received by the receiver 120. The indicators may be any combination of audible, visual, and/or haptic indicators as described above. The multiple indicators may initiate simultaneously or in series.

In some implementations, the system 100 may include a charge monitoring assembly (not shown in FIG. 1) coupled to the receiver 120 and/or the energy storage device 140 and configured to determine the energy storage level of the energy storage device 140. The charge monitoring assembly may include a charge monitoring circuit. The indicator assembly 130 may provide an indication corresponding to a time duration until the energy storage level of the energy storage device 140 is above a threshold energy storage level. The indication may be based, at least in part, on the energy storage level of the energy storage device 140 and a rate of increase of the energy storage level based on a characteristic of the wireless energy. In some implementations, the charge monitoring assembly may determine the energy storage level of the energy storage device 140 and indicate the time duration and/or recharge rate based on the energy storage capacity of the energy storage device 140 and the rate of charging of the energy storage device 140 based on one or more properties (e.g., current and/or RSSI) of the energy received by the receiver 120. In some implementations, the indicator assembly 130 may indicate a charge rate of the energy storage device 140 based on the energy storage level and capacity of the energy storage device 140 and the rate of charging of the energy storage device 140. Thus, if the energy storage level is sufficiently high at the start of a charging operation, even if the rate of charging of the energy storage device is lower (e.g., a rate of charging corresponding to a "medium" range designation), the indicator assembly 130 may indicate that the rate of charging is higher (e.g., a rate of charging corresponding to a "fast" range designation). In some implementations, a fast charging rate designation may correspond to the energy storage level of the energy storage device 140 reaching capacity within a range of about one to about two hours, a medium charging rate designation may correspond to the energy storage level of the energy storage device 140 reaching capacity within a range of about two to about four hours, and a slow charging rate designation may correspond to the energy storage level of the energy storage device 140 reaching capacity within a range of about four to about eight hours.

In some implementations, the system 100 may include an activation assembly. The activation assembly may be coupled to the receiver 120 and/or the energy storage device 140. The activation assembly may be configured such that power is only provided from the receiver 120 to the first energy storage device 140 and/or from the first energy storage device 140 to a second energy storage device (not shown) upon activation of the activation assembly by a user. For example, the activation assembly may include a button or switch that must be actuated (e.g., toggled) by the user to initiate charging of the first energy storage device 140 and/or the transfer of power from the first energy storage device 140.

In some implementations, the system 100 may include a voltage monitoring circuit or other circuit for determining a state of charge of the first energy storage device 140. In some embodiments, the system 100 may include a gas gauge circuit for determining the state of charge of the energy storage device 140. The gas gauge circuit may be implemented using a voltage monitoring circuit. The gas gauge circuit (also referred to as a gauge circuit) may be configured to determine the energy storage level of the energy storage device 140 relative to a capacity of the energy storage device 140. In some implementations, the gas gauge circuit may be configured to produce an output (e.g., via a display) reflecting the energy storage level of the energy storage device 140.

Figure 2:
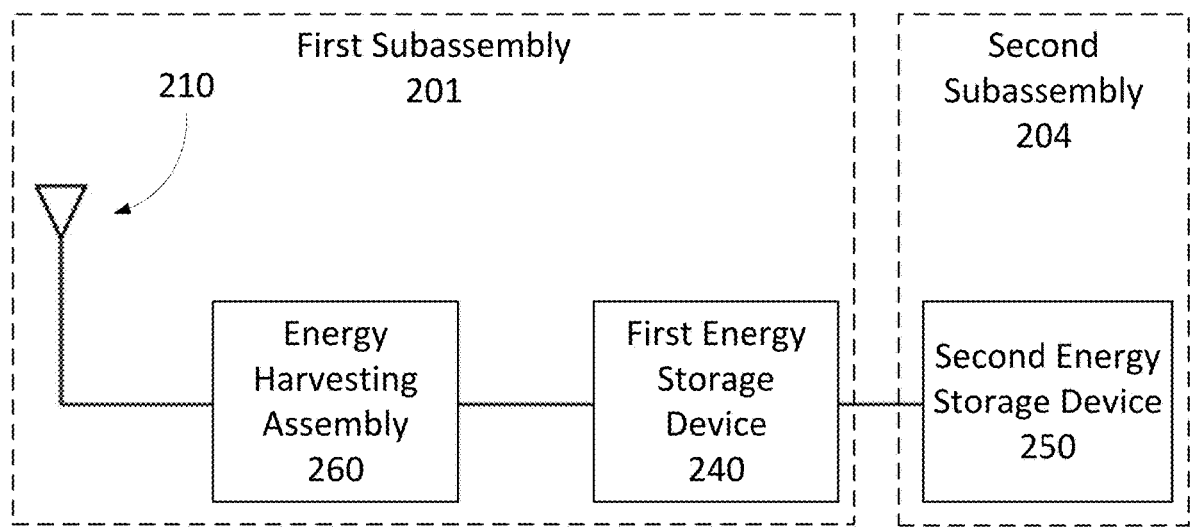
FIG. 2 is a schematic illustrations of a system for receiving and storing wirelessly transferred power, according to an embodiment.

FIG. 2 is a schematic illustration of a system 200. The system 200 includes an antenna 210, an energy harvesting assembly 260, a first energy storage device 240, and a second energy storage device 250. The energy harvesting assembly 260 may include or be coupled to a receiver such as the receiver 120 described above with respect to the system 100. The energy harvesting assembly 260 and/or the receiver may be coupled to the antenna 210. The first energy storage device 240 may be coupled to the energy harvesting assembly 260 and/or the receiver. The first energy storage device 240 may have a first energy storage capacity and the second energy storage device 250 may have a second energy storage capacity. In some implementations, the second energy storage capacity may be greater than the first energy storage capacity.

The first energy storage device 240 may increase an energy storage level of the first energy storage device 240 to a first threshold energy storage level when wireless energy is received by the energy harvesting assembly 260 and/or receiver. In response to the first energy storage device 240 being charged to the first threshold energy storage level, the first energy storage device 240 may provide power to the second energy storage device 250 by sending energy to the second energy storage device 250. In some implementations, the first energy storage device 240 may only transfer power to the second energy storage device 250 when the energy storage level of the first energy storage device 240 is above a threshold energy storage level and the energy storage level of the second energy storage device 250 is below a threshold energy storage level, which may be a different threshold energy storage level than the energy storage level of the first energy storage device 240. In some implementations, the energy transferred from the first energy storage device 240 to the second energy storage device 250 may be transferred wirelessly, inductively, via a wired connection, or via any other suitable power transfer method.

In some implementations, the wireless energy received by the first energy storage device 240 may have a first current and the energy transferred from the first energy storage device 240 to the second energy storage device 250 may have a second current. The second current may be greater than the first current. Thus, if wireless energy is received by the antenna 210 having a current too low compared to the current used to increase the energy storage level of the second energy storage device 250, the wireless energy received by the antenna 210 may be stored in the first energy storage device 240 until the energy storage level of the first energy storage device 240 is high enough to transfer an amount (e.g., a burst) of energy to the second energy storage device 250 having a high enough current to increase the energy storage level of the second energy storage device 250. In some implementations, the energy received by the first energy storage device 240 via the antenna 210 and the energy harvesting assembly 260 may have a first duration or be received for a first period of time, and the energy received by the second energy storage device 250 from the first energy storage device 240 may have a second duration shorter than the first duration or be received for a second period of time. For example, the first period of time may a period of time ranging between, for example, 1-2 hours, 2-4 hours, 4-8 hours, or any other suitable period of time. The second period of time may be, for example, thirty minutes.

In some implementations, the energy harvesting assembly 260 may charge the first energy storage device 240 to and/or above a first threshold energy storage level (e.g., a voltage threshold). In some implementations, the first threshold energy storage level is below a capacity of the first energy storage device 240. In some implementations, the energy harvesting assembly 260 may cease charging the first energy storage device 240 when the energy storage level of the first energy storage device 240 is at or above a second threshold energy storage level. The second threshold may be, for example, at or above 0% of the capacity of the first energy storage device 240. In some implementations, the second threshold may be, for example, at or above 10% of the capacity of the first energy storage device 240. In some implementations, the second threshold may be, for example, at or above 50% of the capacity of the first energy storage device 240.

In some implementations, the system 200 may include one or more temperature sensors. The first threshold energy storage level and/or the second threshold energy storage level may each be automatically adjusted based on temperature data from the one or more temperature sensors. For example, if a temperature sensor coupled to the first energy storage device 240 senses that a temperature of the first energy storage device 240 or a region near the first energy storage device 240 is at or above a threshold temperature, the system 200 (via, for example, a microprocessor of the system 200) may reduce the second threshold energy storage level such that the charging operation slows or discontinues.

In some implementations, the second energy storage device 250 may be coupled to or mounted inside a separate external device. For example, the antenna 210, the energy harvesting assembly 260, and the first energy storage device 240 may be included in a first subassembly 201. The first subassembly 201 may be coupled to or mounted inside a first housing. The second energy storage device 250 may be included in a second subassembly 204 and may be coupled to or mounted inside a second housing and/or inside an external device that may be removably coupleable to the first subassembly 201. In some implementations, the first subassembly 201 and the second subassembly 204 may each include a portion of a connector interface (not shown in FIG. 2) such that the first subassembly 201 and the second subassembly 204 may be electrically coupled. The connector interface may include a standard connector and port (e.g., a USB) or any other suitable connector type.

In some implementations, the first subassembly 201 may support the second subassembly 204. In some implementations, the first subassembly 201 may support more than one separate second subassemblies 204 (e.g., two, three, four or more external devices each having individual energy storage devices). In some implementations, the first subassembly 201 may be alternatively provide power to each separate external device to which the first subassembly 201 is coupled. In some implementations, the first subassembly 201 may evenly or unevenly split power between each separate second subassembly 204.

In some implementations, the first subassembly 201 and the second subassembly 204 may mechanically engage with each other via an engagement mechanism (not shown in FIG. 21). Each of the first subassembly 201 and the second subassembly 204 may include a portion of the engagement mechanism. The engagement mechanism may include a positive lock for which a user actuates a portion of the lock to disengage the first subassembly 201 and the second subassembly 204. For example, the engagement mechanism may include a button or portion to which a user may apply a force to disengage the lock from a latch.

In some implementations, the first energy storage device 240 may receive wireless power via the antenna 210 and the energy harvesting assembly 260 such that an energy storage level of the first energy storage device 240 may increase in the absence of the first subassembly 201 being coupled to the second energy storage device 250. Upon coupling of the first subassembly 201 and the second subassembly 204, power transfer from the first energy storage deice 240 to the second energy storage device 250 may initiate. In some implementations, the first energy storage device 240 and/or the second energy storage device 250 may include an additional charging circuitry (not shown in FIG. 2) configured to regulate an amount of voltage or current applied to energy storage device to the first energy storage device 240 or the second energy storage device 250, respectively.

Although not shown, the system 200 may further include an indicator assembly. The indicator assembly may be the same or similar in structure and/or function to the indicator assembly 130 described above with respect to the system 100. The indicator assembly may be operationally coupled to the first energy storage device 240 and/or the second energy storage device 250 such that the indicator assembly may indicate a charging status and/or rate of the first energy storage device 240 and/or the second energy storage device 250. The indicator assembly may provide an indication of a rate of increase of at least one of the energy storage level of the first energy storage device 240 or the energy storage level of the second energy storage device 250.

Figure 3:
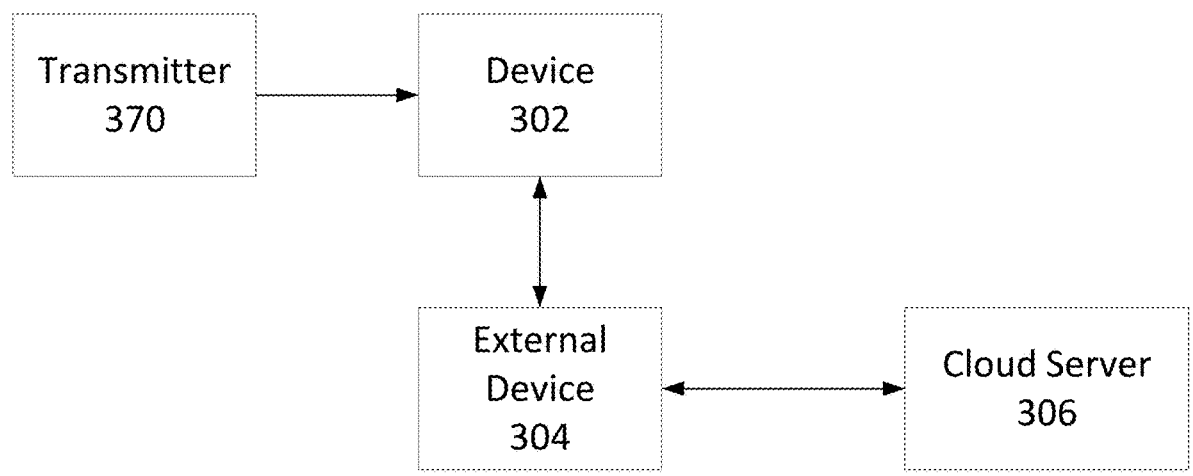
FIG. 3 is a schematic illustration of a system for wirelessly transferring power, according to an embodiment.

FIG. 3 is a schematic illustration of a system 300. The system 300 may include a transmitter 370, a device 302, an external device 304, and a cloud server 306 having a database. The transmitter 370 may transmit wireless energy (e.g., radiofrequency (RF) power or electromagnetic waves) to a charging region or zone such that the device 302 may receive the wireless energy when disposed within the charging region or zone. The device 302 may be the same or similar as or may include any of the systems or devices described herein, such as, for example, the system 100 or the system 200. For example, the device 302 may include an antenna, a receiver, and a first energy storage device. Additionally, the device 302 may include an indicator assembly and/or a second energy storage device.

In some implementations, the device 302 may wirelessly transmit information related to the charging of a first and/or second energy storage device of the device 302 and/or the charging of an energy storage device of an external device 304 to, for example, the external device 304. The external device 304 may be, for example, a smartphone, a headphones set, or an electronic game controller. The charging information may be wirelessly transmitted to a receiver of the external device 304 via, for example, Bluetooth® Low Energy (BLE). In some implementations, the charging information may include an approximate time until an energy storage device of the device 302 is fully recharged.

As shown in FIG. 3, the device 302 or the external device 304 may transmit data to a cloud server 306. The database of the cloud server 306 may store information about the charging or usage of the device 302 and/or the external device 304. Furthermore, the external device 304 may include a display and may run an application configured to indicate a status of an energy storage device of the external device 304 and/or the first and/or second energy storage device of the device 302 based on information received via the cloud server 306.

In some embodiments, the device 302 may communicate (e.g., via Wi-Fi®) with the cloud server 306 via a radio and antenna of the device 302 or with the cloud server via the external device 304. For example, the device 302 may require activation for the device to accept charge from the transmitter 370. Activation may be required using an application of the external device 304 that may communicate with the device 302 and the cloud server 306. The user can enter authentication information that is sent from the external device 304 to the cloud server 306 to authorize the device 302 to charge. Without authentication, an energy harvester of the device 302 does not provide energy or charge to first or second energy storage devices of the device 302. An activation command may be sent from the external device 304 to the device 302 after the device 302 has been authenticated in a database.

Figure 4:
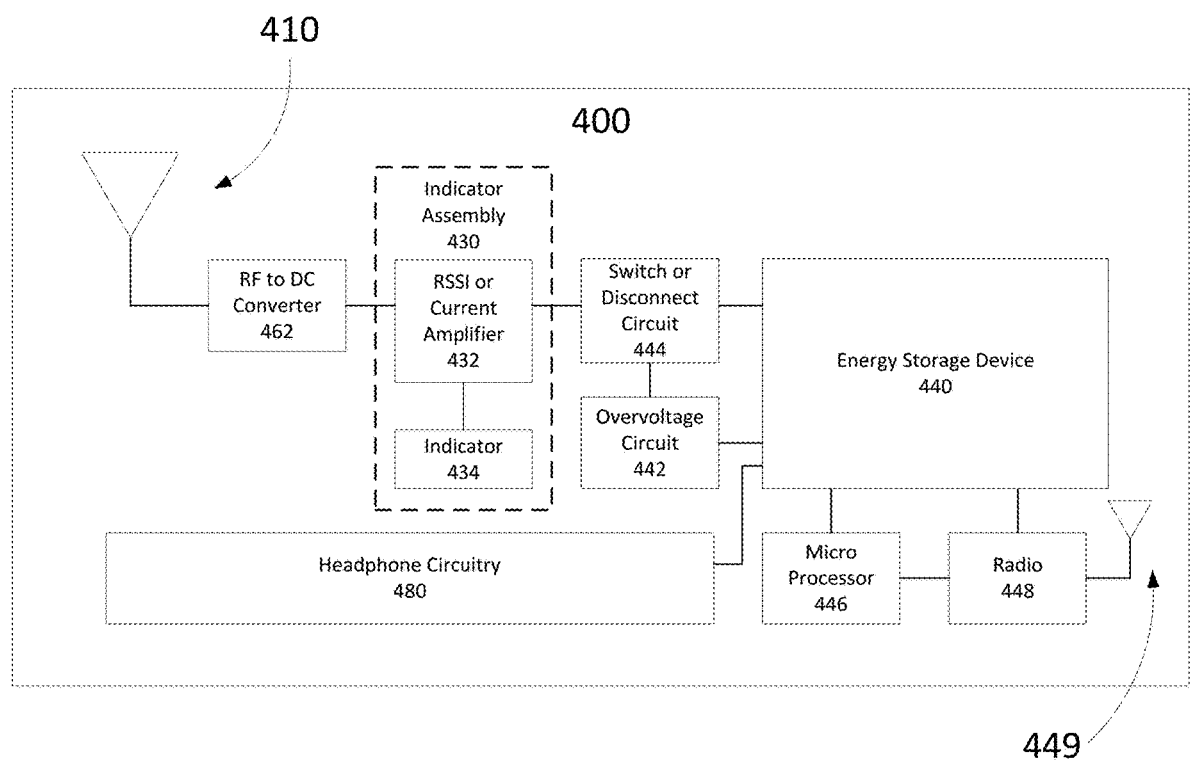
FIG. 4 is a schematic illustration of a system for receiving and storing wirelessly transferred power, according to an embodiment.

FIG. 4 is a schematic illustration of a system 400. The system 400 may be, for example, a wireless device such as headphones. The system 400 may be the same or similar in in structure and/or function to any of the systems or devices described herein, such as, for example, the system 100, the system 200, and/or the device 302. As shown, the system 400 may include an antenna 410, an RF to DC converter 462, an indicator assembly 430, and an energy storage device 440. The antenna 410 and/or the RF to DC converter 462 may be included in an energy harvester. The system 400 may also include an overvoltage circuit 442 and a switch or disconnect circuit 444 coupled to the energy storage device 440. The switch or disconnect circuit 444 may cause the energy storage device 440 to stop charging when the energy storage level of the energy storage device 440 is above a threshold energy storage level or at a capacity energy storage level of the energy storage device 440. The system 400 may further include a microprocessor 446 and a radio 448 and antenna 449 to communicate charging information and/or authentication information to an external device and/or cloud server (e.g., via BLE). Furthermore, the system 400 may include any suitable headphone circuitry 480 configured for wireless headphone operation. The headphone circuitry 480 may be coupled to and configured to be powered by the energy storage device 440. The indicator assembly 430 includes an RSSI monitoring component or current amplifier 432 and an indicator 434 configured to provide an output of the indicator assembly 430 to a user.

In some implementations, the system 400 may include firmware and/or software that is upgradeable over a wireless communication network via the radio 448 and antenna 449. The firmware may be upgradeable via, for example, BLE. In some implementations, the BLE data may be encrypted.

Figure 5:
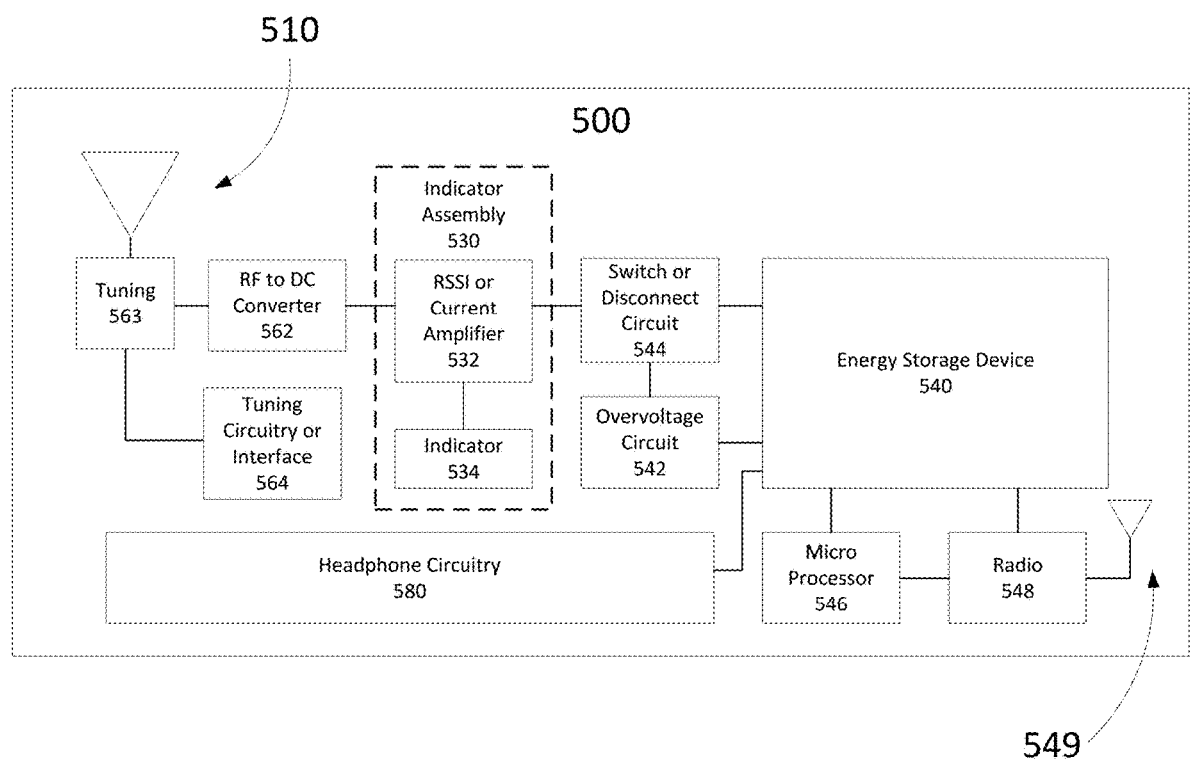
FIG. 5 is a schematic illustration of a system for receiving and storing wirelessly transferred power, according to an embodiment.

FIG. 5 is a schematic illustration of a system 500. The system 500 may be or include, for example, a wireless device such as headphones. The system 500 may be the same or similar in structure and/or function to any of the systems or devices described herein, such as, for example, the system 100, the system 200, the device 302, and/or the system 400. As shown, the system 500 may include an antenna 510, an RF to DC converter 562, an indicator assembly 530, and an energy storage device 540. The system 500 may also include an overvoltage circuit 542 and a switch or disconnect circuit 544 coupled to the energy storage device 540. The system 500 may further include a microprocessor 546 and a radio 548 and antenna 549 to transmit charging information to an external device and/or cloud server (e.g., via BLE). Furthermore, the system 500 may include any suitable headphone circuitry 580 configured for wireless headphone operation. The headphone circuitry 580 may be coupled to and configured to be powered by the energy storage device 540. The indicator assembly 530 includes an RSSI monitoring component or current amplifier 532 and an indicator 534 configured to provide an output of the indicator assembly 530 to a user.

As shown in FIG. 5, the system 500 may also include tuning 563 (also referred to as a tuner or antenna tuning unit) and tuning circuity or interface 564. In some implementations, the antenna 510 may tune automatically. A tuning procedure may be periodically scheduled in software or controlled by a smartphone application over a wireless connection (BLE). In some implementations, the tuning circuitry or interface 564 may be mechanically or electronically movable such that the tuning 563 may be adjusted. Thus, the tuning 563 may be able to adjust for different table, countertop, or stand material that may be adjacent or near the system 500 or a transmitter from which the antenna 510 is receiving wireless energy. For example, in some implementations, the tuning circuitry or interface 564 may include a dial, switch, or other tuning component such that the tuning circuitry or interface 564 is user-tunable. In some implementations, the tuning circuitry or interface 564 may autocorrect or self-adjust. In some implementations, the tuning circuitry or interface 564 may measure a standing wave ratio (SWR) of wireless energy received by the antenna 510. Additionally, the tuning circuitry or interface 564 may monitor charging parameters including but not limited to current and voltage. Furthermore, the tuning circuitry or interface 564 may monitor RF parameters of the wireless energy received by the antenna 510 such as one or more S-parameters (e.g., S11), reflected power, impedance, and reflection coefficient.

Figure 6:
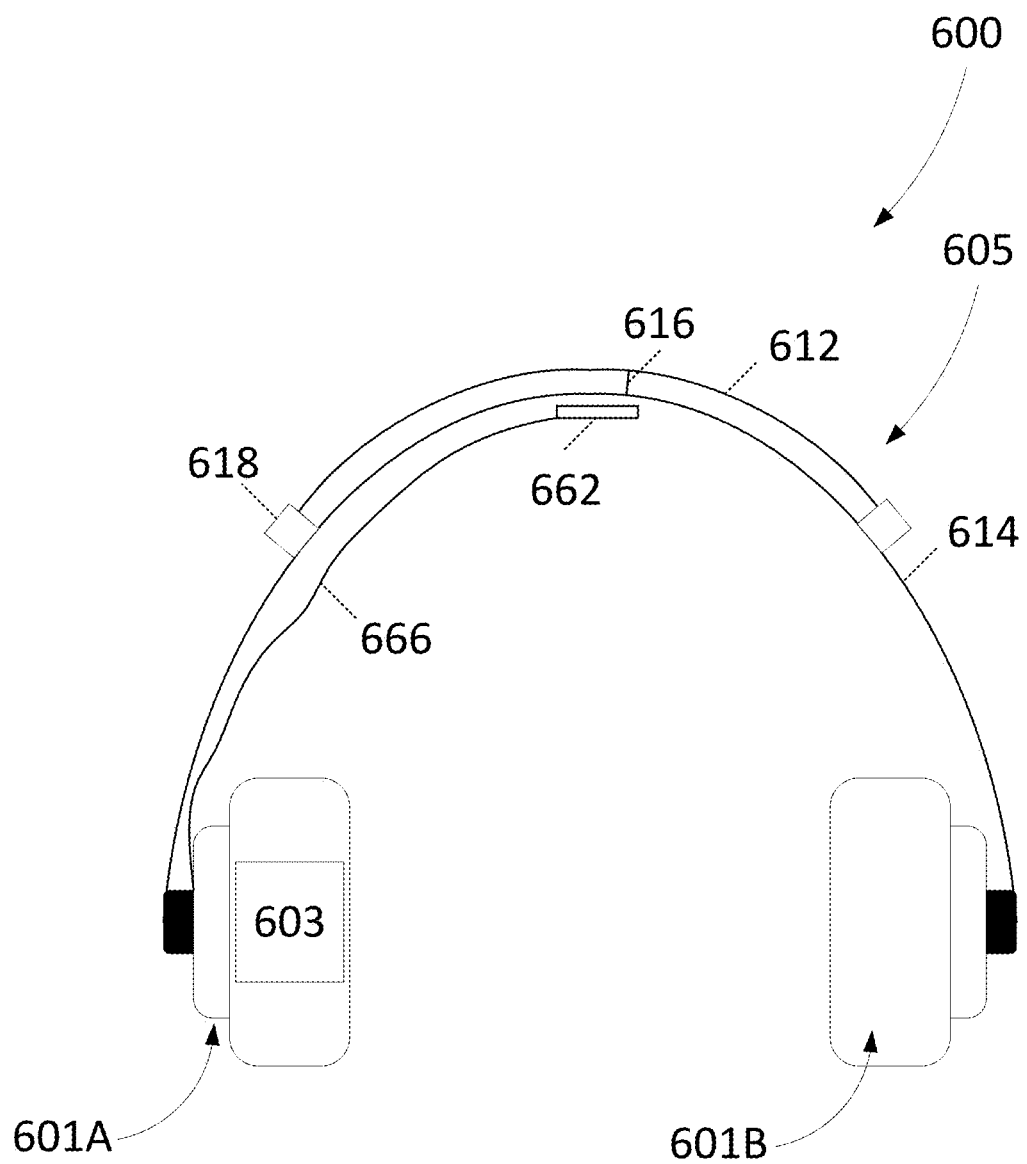
FIG. 6 is a schematic illustration of a system for receiving and storing wirelessly transferred power, according to an embodiment.

FIG. 6 is a schematic illustration of a system 600. The system 600 may be or include, for example, wireless headphones. For example, the system 600 may include a first headphone component 601A and a second headphone component 601B. A headphone assembly 603 may be included in at least one of the first headphone component 601A and the second headphone component 601B. The first headphone component 601A and the second headphone component 601B may each include one or more cushions for engagement with an ear of the user. The headphone assembly 603 may include speakers and known headphone circuitry. The system 600 may be the same or similar in structure and/or function to any of the systems and devices described herein. For example, the system 600 may include the same or similar structure as shown and described with respect to the system 400 and/or the system 500.

As shown in FIG. 6, the system includes an energy storage device (included in the headphone subassembly 603), an RF-to-DC converter 662, and an antenna 605. The antenna 605 may provide power to the energy storage device such that an energy storage level of the energy storage device increases when the energy storage level of the energy storage device is below an energy storage capacity of the energy storage device. The antenna 605 includes a first arcuate metal portion 612 having a first radius and a second arcuate metal portion 614 having a second radius smaller than the first radius. The antenna 605 may be flexible. For example, the first arcuate metal portion 612 and/or the second arcuate metal portion 614 may be flexible.

The antenna also includes a plurality of spacers 618. Each spacer 618 from the plurality of spacers is 618 coupled to the first arcuate metal portion 612 and the second arcuate metal portion 614 such that a portion of the first arcuate metal portion 612 coupled to that spacer and a portion of the second arcuate metal portion coupled to that spacer 614 are spaced apart by a predetermined distance. In some embodiments, the inner surface of the first arcuate metal portion 612 may face an outer surface of the second arcuate metal portion 614. The inner surface of the first arcuate metal portion 612 and the outer surface of the second arcuate metal portion 614 may be spaced by a constant distance along the entire length of the first arcuate metal portion 614. Although two spacers 618 are shown, any suitable number of spacers 618 may be included, such as, for example, three, five, or ten spacers. The spacers 618 may be shaped and sized to maintain the first arcuate metal portion 612 and the second arcuate metal portion 614 a predetermined distance apart. The spacers 618 may be shaped and sized to receive at least one of the first arcuate metal portion 612 and the second arcuate metal portion 614 and may be coupled to at least one of the first arcuate metal portion 612 and the second arcuate metal portion 614 via any suitable method, such as by using adhesive.

In some implementations, one or more of the spacers 618 may allow the first arcuate metal portion 612 to slide through the spacers 618 when the antenna 605 or the system 600 is flexed to allow a bend radius of the first arcuate metal portion 612 and/or the second arcuate metal portion 614 to change independently of the other of the first arcuate metal portion 612 or the second arcuate metal portion 614. Thus, the first arcuate metal portion 612 and the second arcuate metal portion 614 may be spaced a constant first distance from each other in a first configuration, and may be flexed into a second configuration in which the distance between the first arcuate metal portion 612 and the second arcuate metal portion 614 are not spaced a constant distance from each other.

The system 600 also includes a feedpoint 616 coupling the first arcuate metal portion 612 to the second arcuate metal portion 614 and configured to operatively couple the antenna 605 to the RF-to-DC converter 662. The RF-to-DC converter 662 is coupled to the headphone subassembly 603 via a wire 666. Thus, the RF-to-DC converter 662 and/or the antenna 605 may form or be included in an energy harvester. In some implementations, the feedpoint 616 directly connects the antenna 605 to the RF-to-DC converter 662. In some implementations, the feedpoint capacitively couples the antenna 605 to the RF-to-DC converter 662.

In some implementations, a dielectric material may be disposed between the first arcuate metal portion 612 and the second arcuate metal portion 614. The dielectric material may be, for example, air or any other suitable material. The dielectric may be flexible. In some implementations, the first arcuate metal portion 612 may be electrically isolated from the second arcuate metal sheet 614 such that the system 600 is protected from electrostatic discharge (ESD).

In some implementations, the antenna 605 may be a directional antenna. In some implementations, the antenna 605 may be an omnidirectional antenna. The first arcuate metal portion 612 may be a patch antenna and the second arcuate metal portion 614 may be a ground plane. In some implementations, the first arcuate metal portion 612 and/or the second arcuate metal portion 614 may be formed as a sheet. In some implementations, the antenna 605 may form the headband of the system 600. Thus, the antenna 605 may be configured to engage a user's head such that the first headphone component 601A and the second headphone component 601B are maintained adjacent to and/or engaged with the ears of a user. In some implementations, the antenna 605 may be act as a spring to apply pressure to the first headphone component 601A and the second headphone component 601B such that the first headphone component 601A and the second headphone component 601B may be pressed against a user's ears. For example, the second arcuate metal portion 614 has a first end and a second end. The first end is coupled to the first headphone component 601A and the second end coupled to a second headphone component 601B. At least one of the second arcuate metal portion 614 and the first arcuate metal portion 612 may be elastically biased such that, upon engagement of the first headphone component 601A with a first ear of the user and engagement of the second headphone component 601B with a second ear of the user, the first end of the second arcuate metal portion 614 may urge the first headphone component 601A toward the first ear and the second end of the second arcuate metal portion 614 may urge the second headphone component 601B toward the second ear.

In some implementations, the first arcuate metal portion 612 and the second arcuate metal portion 614 may be fully or partially exposed. For example, the first arcuate metal portion 612 and/or the second arcuate metal portion 614 may be visible during use. In some implementations, the first arcuate metal portion 612 and the second arcuate metal portion 614 may be covered with a material such as plastic or foam.

In addition to the energy storage device, the headphone subassembly 603 may also include headphone circuitry (not shown in FIG. 6) and an indicator assembly (not shown in FIG. 6). The headphone circuitry may be any suitable headphone circuitry used in wireless headphones. The headphone circuitry may be powered by the energy storage device of the headphone subassembly 603. The indicator assembly may be the same or similar in structure and/or function to any of the indicator assemblies described herein. In some implementations, the system 600 may incorporate both overvoltage and undervoltage protection in, for example, the headphone subassembly 603.

In some implementations, the system 600 may include a third arcuate member (not shown) distinct from the antenna 605. The antenna 605 may be coupled to the third arcuate portion. For example, the antenna 605 may be mounted to the third arcuate member and the second arcuate metal portion 614 may or may not extend the full length from the first headphone component 601A to the second headphone component 601B. The third arcuate member may have a first end and a second end, each of which is coupled to one of the first headphone component 601A and the second headphone component 601B. The third arcuate member may be configured to engage a user's head such that the first headphone component 601A and the second headphone component 601B are maintained adjacent to and/or engaged with the ears of a user. The third arcuate member may be formed of, for example, plastic. In some implementations, the third arcuate member may be include or be coupled to an adjustable length member such that the system 600 may have an adjustable size from the first headphone component 601A to the second headphone component 601B.

In some implementations, the second arcuate metal portion 614 may be coupled to an extendable member such that a size of the system 600 may be adjusted. For example, an extendable member may be coupled to a first end of the second arcuate metal portion 614 and the first headphone component 601A and may be extendable from a first length to a second length. Thus, the first headphone component 601A may be disposed a first distance from the first end of the second arcuate metal portion 614 when the extendable member has a first length and a second distance from the first end of the second arcuate metal portion 614 when the extendable member has a second length. In some implementations, the system 600 may include two extendable members such that the distance of the second headphone component 601B from the second end of the second arcuate metal portion 614 is also adjustable.

Although the antenna 605 is shown as having one feedpoint 616, in some embodiments the antenna 605 may include more than one feedpoints. In some implementations, an antenna may include more than one feedpoint and more than one harvester such that different polarizations of an RF wave may be captured.

In some implementations, the feedpoint 616 may be mechanically or electronically movable such that the tuning of the antenna 605 and feedpoint 616 may be adjusted. Thus, the antenna 605 may be tunable to adjust for different table, countertop, or stand material that may be adjacent or near the antenna 605 or a transmitter from which the antenna 605 is receiving wireless energy. For example, in some implementations, the feedpoint 616 may be user-tunable via a dial, switch, or other tuning component. In some implementations, the feedpoint 616 may autocorrect or self-adjust. In some implementations, the feedpoint 616 may be tunable via tuning circuitry or a tuning interface that is the same or similar in structure and/or function to the tuning circuitry or interface 564 described above.

Figure 7:
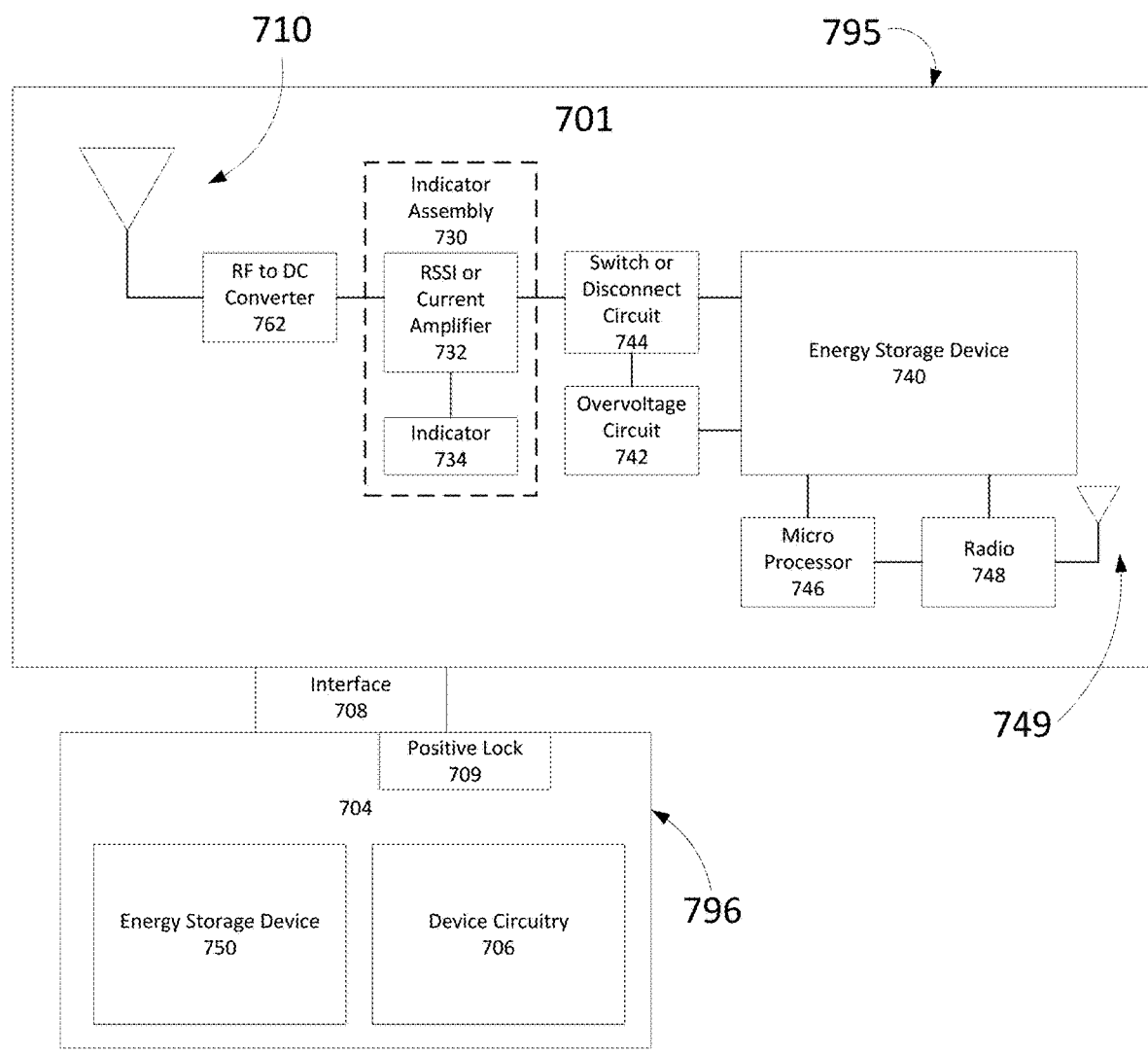
FIG. 7 is a schematic illustration of a system for receiving and storing wirelessly transferred power, according to an embodiment.

FIG. 7 is a schematic illustration of a system 700. The system 700 may be or include, for example, a wireless video game controller. The system 700 may be the same or similar in structure and/or function to any of the systems described herein. For example, as shown in FIG. 7, the system 700 may include a first subassembly 701. The first subassembly 701 may include an antenna 710, an RF to DC converter 762, an indicator assembly 730, and an energy storage device 740. The first subassembly 701 may also include an overvoltage circuit 742 and a switch or disconnect circuit 744 coupled to the energy storage device 740. The first subassembly 701 may further include a microprocessor 746 and a radio 748 and antenna 749 to transmit charging information to an external device and/or cloud server (e.g., via BLE). The indicator assembly 730 includes an RSSI monitoring component or current amplifier 732 and an indicator 734 configured to provide an output of the indicator assembly 730 to a user.

The first subassembly 701 also includes a housing 795 within which the antenna 710, the energy storage device 740 (also referred to herein as a "first energy storage device 740"), and the other components of the first subassembly 701 may be disposed. The antenna 710 may include an antenna portion and a reflector (not shown in FIG. 7). The reflector may be electrically isolated from the antenna portion. The energy storage device 740 may be configured such that an energy storage level of the energy storage device 740 may increase in response to the antenna 710 receiving wireless energy.

For example, the antenna 710 may be a directional antenna to maximize power throughput from the transmitter to the first subassembly 701. The reflector may include a wire. In some implementations, the reflector may be disposed less than a quarter of a wavelength of the wireless energy received by the antenna 710 from the antenna portion. In some implementations, the reflector may be disposed between an eighth of a wavelength and a fourth of a wavelength of the wireless energy received by the antenna 710 from the antenna portion. In some implementations, the antenna portion may include one of a dipole, loop, or folded dipole. In some implementations, the reflector may be user adjustable to maximize performance in the environment.

As shown in FIG. 7, the system 700 may include a second subassembly 704. The second subassembly 704 may be a separate device from the first subassembly 701. The second subassembly 704 may include an energy storage device 750 (also referred to herein as a "second energy storage device 750") and device circuitry 706 disposed within a housing 796. The second subassembly 705, for example, may be a wireless game controller configured to be used with a gaming console. Thus, the device circuitry 706 may be any suitable device circuitry configured such that the a wireless game controller may communicate with a gaming console.

The device circuitry 706 may be coupled to the energy storage device 750 such that the device circuity 706 receives operational energy from the energy storage device 750.

The first subassembly 701 and the second subassembly 704 may be coupled to each other via interface 708. The second subassembly 704 may include, for example, a positive lock 709. The first subassembly 701 may include a portion of the interface 708 including, for example, a latch (not shown in FIG. 7). The positive lock 709 may engage with the latch such that the first subassembly 701 and the second subassembly 704 are secured to each other. A user may actuate the positive lock 709 (e.g., via pressing a release button) to disengage the lock 709 and separate the second subassembly 704 from the first subassembly 701.

When the first subassembly 701 and the second subassembly 704 are secured to each other via the interface 708, the energy storage device 740 of the first subassembly 701 may provide charging energy to the energy storage device 750 of the second subassembly 704. In some implementations, the energy storage device 740 of the first subassembly 701 has a first energy storage capacity and the energy storage device 750 of the second subassembly 704 has a second energy storage capacity greater than the first energy storage capacity. The first energy storage device 740 may provide power to the second energy storage device 750 when the energy storage level of the first energy storage device 740 is above a first threshold energy storage level and an energy storage level of the second energy storage device 750 is below a second threshold energy storage level.

Although system 700 is shown as including a first subassembly 701 and a separate second subassembly 704 housed in different housings (e.g., housing 795 and housing 796), in some implementations, the system 700 may include one housing within which both the first subassembly 701 and the second subassembly 704 are disposed.

Figure 8:
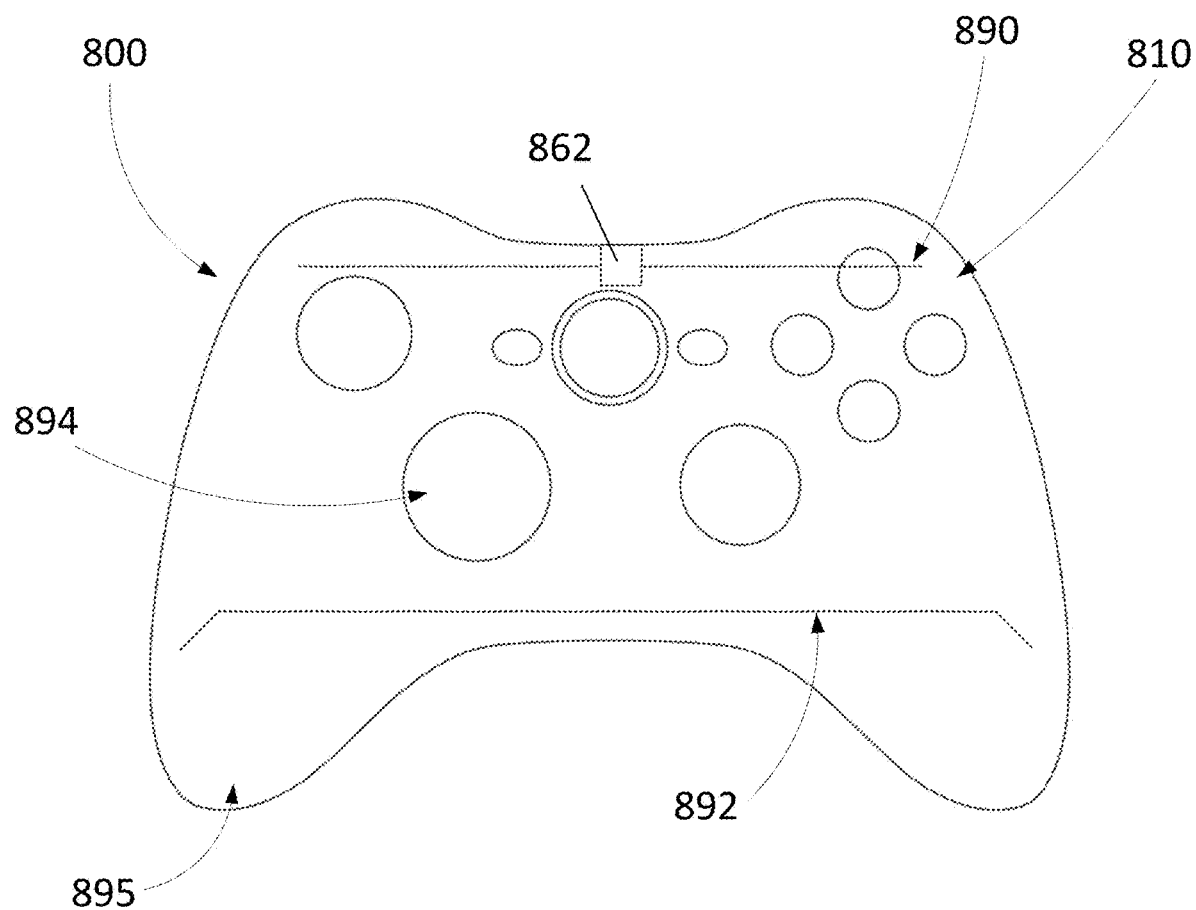
FIG. 8 is a schematic illustration of a system for receiving and storing wirelessly transferred power, according to an embodiment.

FIG. 8 is an illustration of a system 800. The system 800 may be the same or similar in structure and/or function to any of the systems described herein such as, for example, the system 700. For example, the system 800 may be a game controller having a housing 895 and including buttons and/or toggles 894. As shown, the system 800 may include an antenna 810 having an antenna portion 890 and a reflector 892, which may be the same or similar in structure and/or function to the antenna 710 described above. An RF to DC converter 862, which may be the same or similar as the RF to DC converter 762 described above, may be coupled to the antenna portion 890.

Figure 9:
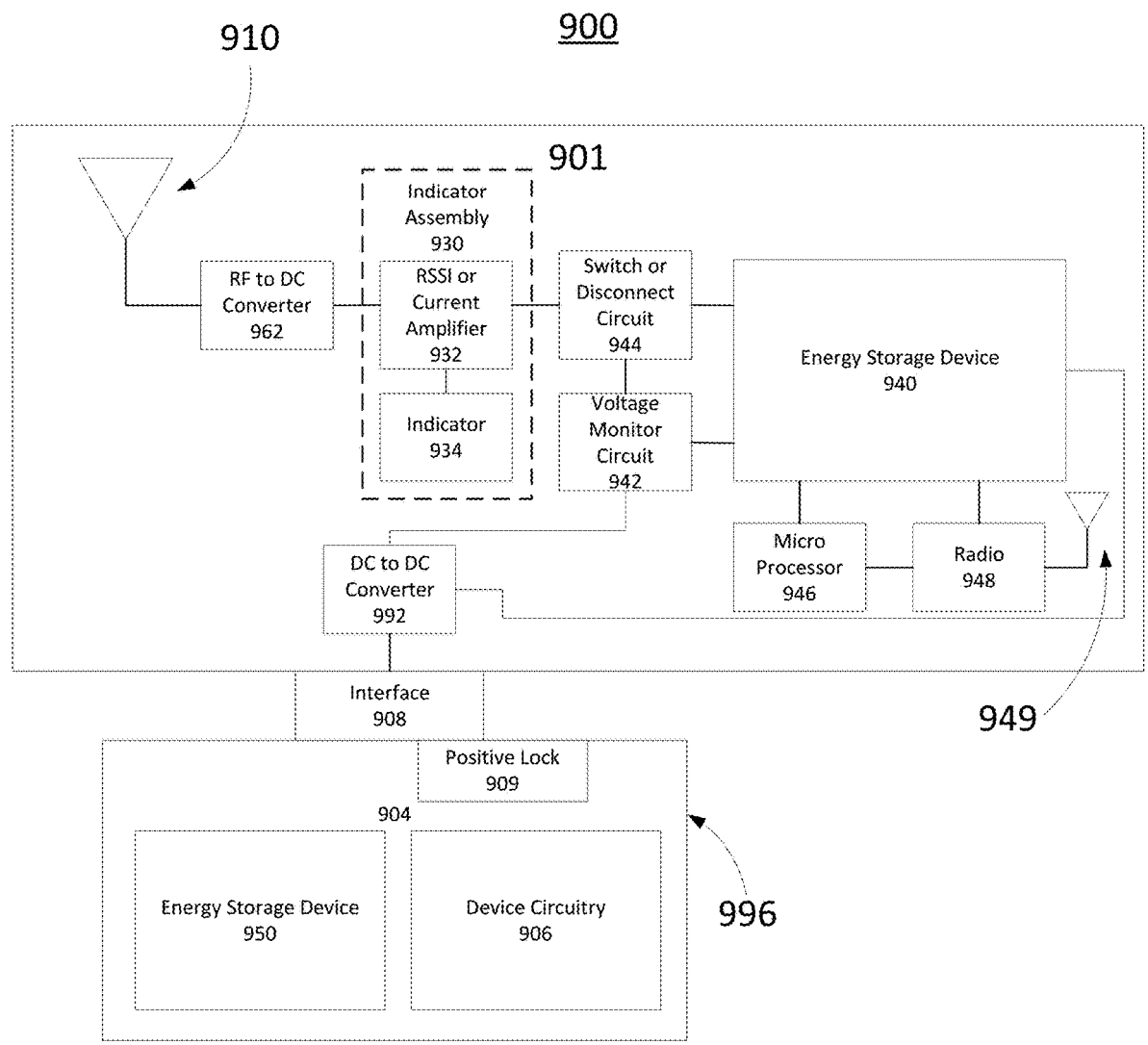
FIG. 9 is schematic illustration of a system for receiving and storing wirelessly transferred power, according to an embodiment.

FIG. 9 is a schematic illustration of a system 900. The system 900 may be or include, for example, a wireless video game controller. The system 900 may be similar in structure and/or function to any of the systems described herein, such as the systems 700 and/or 800. For example, as shown in FIG. 9, the system 900 may include a first subassembly 901. The first subassembly 901 may include an antenna 910, an RF to DC converter 962, an indicator assembly 930, and an energy storage device 940. The first subassembly 901 may also include an overvoltage circuit 942 and a switch or disconnect circuit 944 coupled to the energy storage device 940. The first subassembly 901 may further include a microprocessor 946 and a radio 948 and antenna 949 to transmit charging information to an external device and/or cloud server (e.g., via BLE). The indicator assembly 930 includes an RSSI monitoring component or current amplifier 932 and an indicator 934 configured to provide an output of the indicator assembly 930 to a user.

The first subassembly 901 also includes a housing 995 within which the antenna 910, the energy storage device 940 (also referred to herein as a "first energy storage device 940"), and the other components of the first subassembly 901 may be disposed. The antenna 910 may include an antenna portion and a reflector (not shown in FIG. 9). The reflector may be electrically isolated from the antenna portion. The energy storage device 940 may be configured such that an energy storage level of the energy storage device 940 may increase in response to the antenna 910 receiving wireless energy.

For example, the antenna 910 may be a directional antenna to maximize power throughput from the transmitter to the first subassembly 901. The reflector may include a wire. In some implementations, the reflector may be disposed less than a quarter of a wavelength of the wireless energy received by the antenna 910 from the antenna portion. In some implementations, the reflector may be disposed between an eighth of a wavelength and a fourth of a wavelength of the wireless energy received by the antenna 910 from the antenna portion. In some implementations, the antenna portion may include one of a dipole, loop, or folded dipole. In some implementations, the reflector may be user adjustable to maximize performance in the environment.

As shown in FIG. 9, the system 900 may include a second subassembly 904. The second subassembly 904 may be a separate device from the first subassembly 901. The second subassembly 904 may include an energy storage device 950 (also referred to herein as a "second energy storage device 950") and device circuitry 906 disposed within a housing 996. The second subassembly 905, for example, may be a wireless game controller configured to be used with a gaming console. Thus, the device circuitry 906 may be any suitable device circuitry configured such that the a wireless game controller may communicate with a gaming console. The device circuitry 906 may be coupled to the energy storage device 950 such that the device circuity 906 receives operational energy from the energy storage device 950.

The first subassembly 901 and the second subassembly 904 may be coupled to each other via interface 908. The second subassembly 904 may include, for example, a positive lock 909. The first subassembly 901 may include a portion of the interface 908 including, for example, a latch (not shown in FIG. 9). The positive lock 909 may engage with the latch such that the first subassembly 901 and the second subassembly 904 are secured to each other. A user may actuate the positive lock 909 (e.g., via pressing a release button) to disengage the lock 909 and separate the second subassembly 904 from the first subassembly 901.

When the first subassembly 901 and the second subassembly 904 are secured to each other via the interface 908, the energy storage device 940 of the first subassembly 901 may provide charging energy to the energy storage device 950 of the second subassembly 904. In some implementations, the energy storage device 940 of the first subassembly 901 has a first energy storage capacity and the energy storage device 950 of the second subassembly 904 has a second energy storage capacity greater than the first energy storage capacity. The first energy storage device 940 may provide power to the second energy storage device 950 when the energy storage level of the first energy storage device 940 is above a first threshold energy storage level and an energy storage level of the second energy storage device 950 is below a second threshold energy storage level.

Although system 900 is shown as including a first subassembly 901 and a separate second subassembly 904 housed in different housings (e.g., housing 995 and housing 996), in some implementations, the system 900 may include one housing within which both the first subassembly 901 and the second subassembly 904 are disposed.

As shown in FIG. 9, the system 900 also includes a DC to DC converter 992 (also referred to as a "boost converter"). The DC to DC converter 992 is coupled to the first energy storage device 940 and can increase the voltage of the energy transferred from the first energy storage device 940 to the second energy storage device 950. For example, the DC to DC converter 992 may be configured to step up the voltage and step down the current of the power that the DC to DC converter 992 receives from the first energy storage device 940 such that the power output of the DC to DC converter 992 to the second energy storage device 950 has a higher voltage than the output of the first energy storage device 940. In some implementations, the DC to DC converter 992 may be configured to increase the voltage of the energy outputted by the first energy storage device 940 above a predetermined voltage threshold or to a predetermined voltage range. In some implementations, the predetermined voltage threshold or predetermined voltage range may correspond to a voltage that the second subassembly 904 would receive if connected to a wired charging console or wall outlet. Additionally, the DC to DC converter 992 may be coupled to the voltage monitoring circuit 942.

Figure 10:
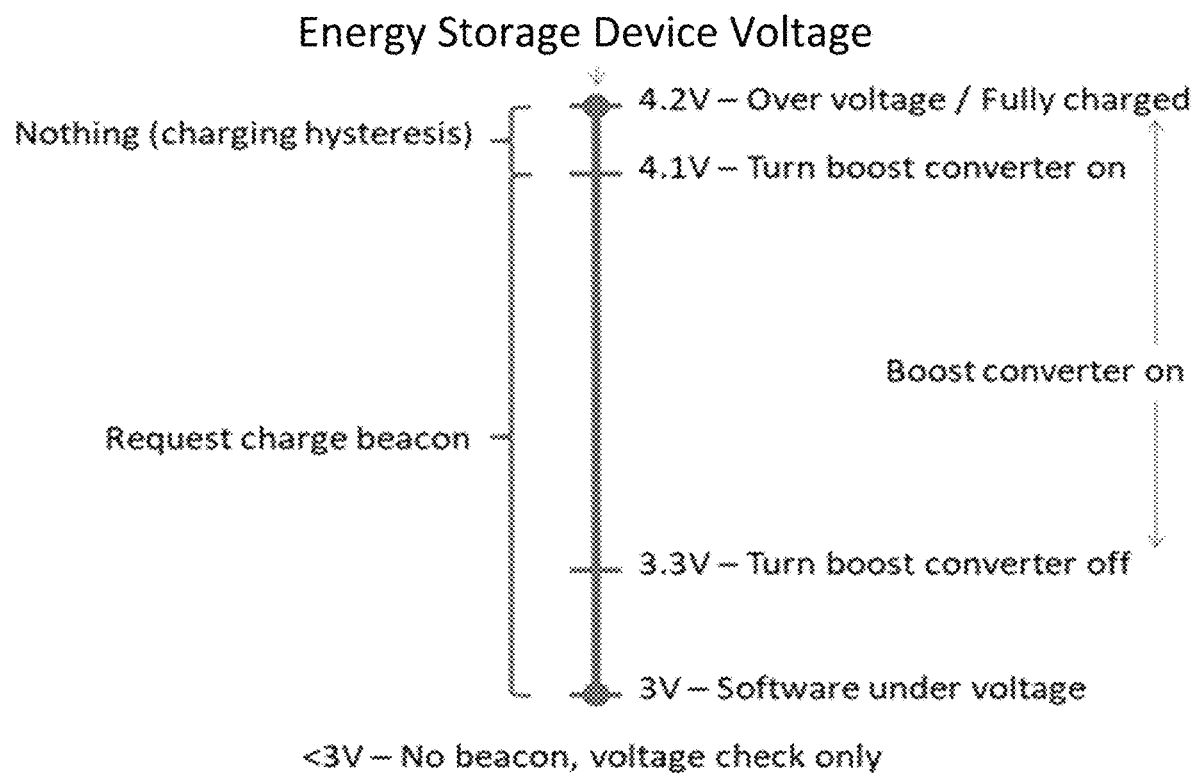
FIG. 10 is a chart illustrating operational ranges of the system of FIG. 9, according to an embodiment.

FIG. 10 is a chart illustrating operational ranges of a system or device such as the system 900 of FIG. 9. As shown in FIG. 10, when an energy storage device of the system (e.g., energy storage device 940) has an energy storage level below a first threshold energy storage level (e.g., below 3 V), the system may perform a voltage check of the energy storage level of the energy storage device 940 but not send beacons requesting power. If the energy storage device has an energy storage level above the first threshold energy storage level and below a second threshold energy storage level (e.g., between about 3V and about 3.3V), software associated with the energy storage device can run using power from the energy storage device (e.g., on a microprocessor coupled to the energy storage device). With a voltage within the first threshold energy storage level and the second threshold energy storage level, the system may send one or more beacons requesting energy be sent to the system. For example, the system may send a beacon indicating that charge is requested such that any transmitter receiving the beacon may response by transmitting wireless power. With a voltage within the first threshold energy storage level and the second threshold energy storage level, a boost converter of the system is off. If the energy storage device has an energy storage level above the second threshold voltage and below a third threshold voltage (e.g., between about 3.3V and 4.1V), the boost converter of the system can be on and operational such that energy may be transferred from the energy storage device 940, through the boost converter (e.g., DC to DC converter 992), and to a second energy storage device. With a voltage within the second threshold energy storage level and the third threshold energy storage level, the system may continue to send charge request beacons. However, if the energy storage device has an energy storage level at or above the third threshold energy storage level (e.g., above 4.1V) the system may discontinue sending charge request beacons and instead enter a charging hysteresis state. The third threshold energy storage level may be below the energy storage capacity of the energy storage device. For example, the energy storage device may have a capacity above the third threshold energy storage level (e.g., a capacity of 4.2V) such that when an energy storage level is above the third threshold energy level and/or at capacity the energy storage device is over voltage or fully charged. In some implementations, the boost converter does not initiate as the energy storage level increases above the second threshold voltage. Rather, the boost converter will remain off as the energy storage device is charged until the energy storage level reaches or exceeds the third energy storage level (e.g., 4.1 V). If the energy storage level is between the third energy storage level and the fourth energy storage level, the system may deliver power from the energy storage device to another energy storage device and may initiate the boost converter to deliver the power at an increased voltage compared to the output of the energy storage device.

In some implementations, any of the systems and/or devices described herein may include multiple arrayed antennas configured to feed to a single energy harvester. In some implementations, any of the systems and/or devices described herein may include multiple antennas co-located on a device, each antenna being associated with an individual energy harvester. In some implementations, any of the systems and/or devices described herein may include both arrayed and co-located antennas that may be used simultaneously.

In some implementations, an antenna any of the systems and/or devices described herein may include a ground that may be capacitively coupled to a metal portion of an end device (e.g., a mobile phone, wireless headphones, a wireless game controller, or any other suitable device that can be wirelessly charged).

In some embodiments, an end device (e.g., any of the systems or devices described herein and/or a mobile phone, headphones, or any other suitable device that can be wirelessly charged via any of the intermediary systems or devices described herein) may coordinate charging of an energy storage device of the end device by communicating with a transmitter. In some implementations, the end device may control the overall charging operations (e.g., initiate and/or cease charging) based on information received from the transmitter or via an intermediary device such as whether a charging operation has been activated, the amount of RF energy transmitted, whether a charging operation has been deactivated, a stored energy level of the energy storage device of the end device, a current level of the wireless energy received from the transmitter, and/or an RSSI of the wireless energy received from the transmitter.

In some implementations, a system, such as any of the systems described herein, may include a transmitter. In some implementations, any of the devices described herein may be included in a system also including a transmitter. The transmitter (e.g., an RF transmitter) may adjust its radiation pattern and/or gain such that a throughput of the transmitter may be increased. Additionally, the transmitter and an end device (such as any of the devices described herein) may each adjust their polarity to maximize throughput.

In some implementations, a system, such as any of the systems described herein, may include a transmitter. In some implementations, any of the devices described herein may be included in a system also including a transmitter. The transmitter may delay sending wireless power or energy by a predetermined length of time such that a user may exit a charging zone of the transmitter before a charging operation is initialized (e.g., before wireless power is sent to the end device). Thus, the user may carry a wireless device (e.g., an end device) into a charging zone and dispose the wireless device in the charging zone. For example, the user may move a wireless device toward a transmitter until an indicator assembly of the wireless device indicates that the wireless device is within a charging zone of the transmitter. The wireless device may send a signal or beacon to the transmitter indicated that the wireless device is disposed within the charging zone of the transmitter. Upon receiving the signal or beacon, the transmitter may initiate a timer for a predetermined length of time. The user may then exit the charging zone, leaving the wireless device within the charging zone. After the predetermined length of time has elapsed, the transmitter may initiate sending wireless power to the wireless device.

In some implementations, the systems or devices described herein may have a secondary means of recharging. For example, the systems or devices described herein may include a connector interface for connection to a traditional wall charger (e.g., a USB port and a wall wart configured to mate with an AC outlet). Additionally, the systems or devices described herein may have a secondary wireless charging means such as Qi inductive based charging.

In some implementations, multiple systems or devices, such as any of the systems or devices described herein, may simultaneously receive wireless energy from one or more transmitters.

In some implementations, any of the systems or devices described herein may be configured to maximize the RF to DC conversion efficiency based, at least in part, on the distance the system or device is from a transmitter. For example, the system or device may include an efficiency maximizing circuit that monitors the amount of received RF power or rectified RF power and adjusts the load voltage on the RF harvester or the RF tuning to maximize the harvested power. In some implementations, the system or device may include multiple RF to DC converters and a switching network. The switching network may be configured to switch in and out RF to DC converters and/or other components to select the most efficient RF to DC converter based on the operating point or received RF power level.

In some implementations, any of the systems or devices described herein may include more than one energy harvester. For example, any of the systems or devices described herein may include a second RF energy harvester configured to capture RF from WiFi signals. The second RF energy harvester may be configured to work in conjunction with the first energy harvester to increase the energy storage level of an energy storage device.

In some implementations, a system, such as any of the systems described herein, may include a transmitter such as any of the transmitters described in PCT/US2018/049392, filed Sep. 4, 2018, entitled "Methods, Systems, and Apparatus for Automatic RF Power Transmission and Single Antenna Energy Harvesting" (referred to herein as the '392 PCT), which is incorporated by reference herein in its entirety. In some implementations, any of the devices described herein may be included in a system also including any of the transmitters described in the '392 PCT. For example, the transmitter may be able to send wireless power over a particular range or distance. Thus, the transmitter may have a range or zone (e.g., a three-dimensional area) over which the transmitter is configured to send wireless power to charge the energy storage devices associated with the one or more receivers. The range or zone may be independent of a location of a receiver, such as any of the wireless devices described herein. Each of the one or more receivers, such as any of the wireless devices described herein, may have a particular range over which the one or more receivers may be configured to send wireless communications (e.g., beacons). The range over which the one or more receivers may be configured to send wireless communications may be greater than the range over which the transmitter may be able to send wireless power. Thus, in some embodiments, the system may be configured such that the transmitter will only initiate sending wireless power when at least one of the one or more receivers is within the zone or range of the transmitter and able to receive wireless power from the transmitter such that the transmitter may charge the energy storage device of the receiver. In some embodiments, the system may be configured such that the transmitter will only continue sending wireless power when at least one of the one or more receivers is within the zone or range of the transmitter and able to receive wireless power from the transmitter such that the transmitter may charge the energy storage device of the receiver. Furthermore, the system may include two or more transmitters. The transmitters may be disposed within a space, such as the same room or different rooms of the same building (e.g., house). The system may be configured such that, even if two or more of the transmitters receive a wireless communication from a receiver (e.g., requesting wireless power), only the transmitter that is sufficiently close to the receiver to transmit wireless power to the receiver will be activated and/or will continue sending wireless power to the receiver after an initial period. The system may also be configured such that, if the receiver is moved away from a first transmitter and toward a second transmitter, the receiver may activate the second transmitter and stop receiving powering energy (e.g., charging energy) from the first transmitter such that the receiver continues to receive powering energy in series with no or only a brief interruption in wireless power delivery.

In some implementations, a system may include a transmitter and a receiver. The receiver may include any of the systems or wireless devices described herein. The transmitter may include any of the transmitters described herein. The receiver may be configured to request power to be transmitted via wireless communication (e.g., via sending a beacon). The transmitter may receive the request from the receiver and, in response to receiving the request, transition from an initial state (i.e., an initial mode) in which the transmitter is not sending any signals to a first state (i.e., a first mode) in which the transmitter sends power and data to the receiver. The data may include transmitter identification information (e.g., a transmitter identification number) uniquely associated with the transmitter. When the transmitter sends power and data to the receiver in the first state, the transmitter may initiate a first timeout timer, setting a first time duration (e.g., 3-5 seconds) within which the transmitter receives a wireless communication (e.g., a request for power) including the transmitter identification information uniquely associated with the transmitter, or else the transmitter will return to the initial state. Thus, if the transmitter does not receive a wireless communication including the transmitter identification information uniquely associated with the transmitter within the first time duration (e.g., before the first time duration elapses and the timeout timer runs to zero), the transmitter may return to the initial state. If the transmitter receives a wireless communication including the transmitter identification information uniquely associated with the transmitter within the first time duration, the transmitter may transition to a second state (i.e., a second mode) in which the transmitter sends power and data to the receiver to charge the receiver.

When the transmitter sends power and data to the receiver in the second state, the transmitter may initiate a second timeout timer, setting a second time duration (e.g., 1 minute) longer than the first time duration within which the transmitter must receive a wireless communication (e.g., a request for power) including the transmitter identification information uniquely associated with the transmitter, or else the transmitter will return to the initial state. Thus, if the transmitter does not receive a request for power including the transmitter identification information uniquely associated with the transmitter within the second time duration (e.g., before the second time duration elapses and the timeout time runs to zero), the transmitter may return to the initial state. If the transmitter receives a wireless communication including the transmitter identification information uniquely associated with the transmitter within the second time duration, the second timeout timer may reset. The timeout timer of the transmitter may be configured to reset every time the transmitter receives a wireless communication including the transmitter identification information uniquely associated with the transmitter such that the transmitter may continue sending power and data to the receiver for a period of time significantly longer than the second time duration (e.g., hours). Furthermore, the second timeout timer of the transmitter may be configured to reset regardless of the source of the wireless communication including the transmitter identification information. Thus, if the system includes a number of receivers, a wireless communication including the transmitter identification information uniquely associated with the transmitter from any of the receivers (i.e., fewer than all receivers) may reset the second timeout timer of the transmitter.

In some implementations, a system includes a transmitter and a receiver. The receiver may include any of the systems or wireless devices described herein. The transmitter may include any of the transmitters described herein. The transmitter may send (e.g., in a first mode or a ping mode) discrete pings of wireless power and data to a zone or area surrounding the transmitter. The pings may have a duration, for example, of about 200 ms to about 3 seconds. The pings may be sent, for example, every 5-30 seconds. The data may include transmitter identification information (e.g., a transmitter identification number) uniquely associated with the transmitter. If the receiver is located within the zone or area surrounding the transmitter such that the receiver is close enough to the transmitter to receive the wireless power, the receiver may receive the wireless power and the transmitter identification information uniquely associated with the transmitter and send a wireless communication (e.g., a beacon) including the transmitter identification information. If the transmitter does not receive a wireless communication including the transmitter identification information uniquely associated with the transmitter (e.g., because no receiver is within the zone or no receiver within the zone needs wireless power), the transmitter may continue to send the discrete pings. If the transmitter does receive a wireless communication including the transmitter identification information uniquely associated with the transmitter (e.g., because the receiver is in the zone), the transmitter may transition to a second mode (e.g., a powering and/or charge mode) in which the transmitter sends wireless power and the transmitter identification information uniquely associated with the transmitter to the zone or area surrounding the transmitter for a period of time longer than the length of a discrete ping.

For example, the transmitter may include a timeout timer such that, when the transmitter sends a wireless signal including power and data to the zone or area in the second mode, the transmitter may initiate the timeout timer, setting a time duration (e.g., 1 minute) within which the transmitter must receive a wireless communication (e.g., a request for power) including the transmitter identification information uniquely associated with the transmitter, or else the transmitter will return to the ping mode. In some embodiments, the wireless communication includes only the transmitter identification information uniquely associated with the transmitter from which the receiver received powering or charging energy. Thus, if the transmitter does not receive a request for power including the transmitter identification information uniquely associated with that transmitter within the time duration (e.g., before the time duration elapses and the timeout timer runs to zero), the transmitter may return to the initial state after the time duration elapses. If the transmitter receives a wireless communication including the transmitter identification information uniquely associated with that transmitter within the time duration (e.g., from the receiver in the zone), the timeout timer may reset. The timeout timer of the transmitter may be configured to reset every time the transmitter receives a wireless communication including the transmitter identification information uniquely associated with the transmitter such that the transmitter may continue sending power and data to the receiver for a period of time significantly longer than the time duration (e.g., hours). Furthermore, the timeout timer of the transmitter may be configured to reset regardless of the source as long as the wireless communication includes the transmitter identification information. Thus, if the system includes a number of receivers, a wireless communication including the transmitter identification information uniquely associated with the transmitter from any of the receivers (i.e., fewer than all receivers) may reset the timeout timer of the transmitter. For example, a first receiver may send an initial wireless communication to the transmitter such that the transmitter begins sending power and data to the zone and charges the first receiver, and a second receiver disposed in the zone may send a later wireless communication including the transmitter identification information uniquely associated with the transmitter such that the timeout timer of the transmitter resets.

While various embodiments of the invention have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the systems (or any of its components) described herein can include a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

Although various embodiments have been described as having particular features and/or combinations of components, other embodiments are possible having a combination of any features and/or components from any of the embodiments where appropriate.

The invention claimed is:

1. An apparatus, comprising:
an antenna; and
an energy storage device;
a receiver coupled to the antenna and the energy storage device, the receiver configured to receive wireless energy via the antenna such that an energy storage level of the energy storage device is increased; and
an indicator assembly coupled to the receiver and configured, in response to the receiver receiving the wireless energy, to determine whether a characteristic of the wireless energy is within a first predetermined range and to provide a first indication based, at least in part, on a determination that the characteristic of the wireless energy is within the first predetermined range, the indicator assembly configured to determine whether the characteristic of the wireless energy is within a second predetermined range and to provide a second indication different from the first indication based, at least in part, on a determination that the characteristic of the wireless energy is within the second predetermined range.

2. The apparatus of claim 1, wherein:
the indicator assembly is configured to determine whether the wireless energy is capable of increasing the energy storage level of the energy storage device, and
the first indication is based, at least in part, on a determination that the wireless energy is capable of increasing the energy storage level of the energy storage device.

3. The apparatus of claim 1, wherein
the characteristic of the wireless energy is a current level of the wireless energy.

4. The apparatus of claim 1, wherein:
the characteristic of the wireless energy is a current level of the wireless energy, and
the indicator assembly includes a current sense amplifier.

5. The apparatus of claim 1, wherein:
the characteristic of the wireless energy is a received signal strength of the wireless energy.

6. The apparatus of claim 1, wherein the first indication includes an audible indication.

7. The apparatus of claim 1, wherein the first indication includes a visual indication.

8. The apparatus of claim 1, wherein:
the first indication includes a visual indication, and
the indication assembly includes at least one light emitting diode.

9. The apparatus of claim 1, wherein the first indication includes a haptic indication.

10. The apparatus of claim 1, further comprising:
a charge monitoring assembly coupled to the receiver and configured to determine the energy storage level of the energy storage device,
the first indication provided by the indicator assembly configured to indicate a time duration until the energy storage level of the energy storage device is above a threshold energy storage level,
the first indication based, at least in part, on the energy storage level of the energy storage device and a rate of increase of the energy storage level based on the characteristic of the wireless energy.

11. The apparatus of claim 1, wherein the indicator assembly is configured to provide a third indication in response to a discontinuation of the receiver receiving the wireless energy.

12. The apparatus of claim 1, wherein the energy storage device is a first energy storage device, the apparatus further comprising:
a second energy storage device coupled to the first energy storage device, the first energy storage device configured to provide power to the second energy storage device when the energy storage level of the first energy storage device is above a first threshold energy storage level and an energy storage level of the second energy storage device is below a second threshold energy storage level.

13. An apparatus, comprising:
an antenna;
a receiver coupled to the antenna;
a first energy storage device coupled to the receiver, the first energy storage device is configured to increase an energy storage level of the first energy storage device to a first threshold energy storage level when a wireless first energy is received by the receiver, the wireless first energy having a current, the first threshold energy storage level being below an energy storage capacity of the first energy storage device,
the first energy storage device configured to provide power to a second energy storage device having a second energy storage capacity greater than the first energy storage capacity by sending a second energy to the second energy storage device, the second energy having a current greater than the current of the wireless first energy; and
an indicator assembly coupled to the receiver and configured, in response to the receiver receiving the wireless first energy, to determine whether a characteristic of the wireless first energy is within a first predetermined range and to provide a first indication based, at least in part, on a determination that the characteristic of the wireless first energy is within the first predetermined range, the indicator assembly configured to determine whether the characteristic of the wireless first energy is within a second predetermined range and to provide a second indication different from the first indication based, at least in part, on a determination that the characteristic of the wireless first energy is within the second predetermined range.

14. The apparatus of claim 13, wherein the wireless first energy has a first duration and the second energy has a second duration shorter than the first duration.

15. The apparatus of claim 13, wherein the first indication includes an indication of a rate of increase of at least one of the energy storage level of the first energy storage device or the energy storage level of the second energy storage device.

16. An apparatus, comprising:
a housing;
an antenna disposed within the housing, the antenna including an antenna portion and a reflector, the reflector electrically isolated from the antenna portion;
an energy storage device disposed within the housing and configured such that an energy storage level of the energy storage device can increase in response to the antenna receiving wireless energy;
a receiver coupled to the antenna and configured to receive the wireless energy via the antenna; and
an indicator assembly coupled to the receiver and configured, in response to the receiver receiving the wireless energy, to determine whether a characteristic of the wireless first energy is within a first predetermined range and to provide a first indication based, at least in part, on a determination that the characteristic of the wireless first energy is within the first predetermined range, the indicator assembly configured to determine whether the characteristic of the wireless first energy is within a second predetermined range and to provide a second indication different from the first indication based, at least in part, on a determination that the characteristic of the wireless first energy is within the second predetermined range.

17. The apparatus of claim 16, wherein the antenna is a directional antenna.

18. The apparatus of claim 16, wherein the reflector includes a wire.

19. The apparatus of claim 16, wherein the reflector is disposed less than a quarter of a wavelength of the wireless energy from the antenna portion.

20. The apparatus of claim 16, wherein the reflector is disposed between an eighth of a wavelength and a fourth of a wavelength of the wireless energy from the antenna portion.

21. The apparatus of claim 16, wherein the antenna portion includes one of a dipole, loop, or folded dipole.

22. The apparatus of claim 16, wherein the energy storage device is a first energy storage device, the first energy storage device having a first energy storage capacity, the apparatus further comprising:
a second energy storage device having a second energy storage capacity greater than the first energy storage capacity, the first energy storage device configured to provide power to the second energy storage device when the energy storage level of the first energy storage device is above a first threshold energy storage level and an energy storage level of the second energy storage device is below a second threshold energy storage level.

23. The apparatus of claim 16, wherein the energy storage device is a first energy storage device, the first energy storage device having a first energy storage capacity, the apparatus further comprising:
a second energy storage device disposed within the housing and having a second energy storage capacity greater than the first energy storage capacity, the first energy storage device configured to provide power to the second energy storage device when the energy storage level of the first energy storage device is above a first threshold energy storage level and an energy storage level of the second energy storage device is below a second threshold energy storage level.

24. The apparatus of claim 16, wherein the housing is a first housing, the energy storage device is a first energy storage device, the first energy storage device having a first energy storage capacity, the apparatus further comprising:
a second energy storage device having a second energy storage capacity greater than the first energy storage capacity, the first energy storage device configured to provide power to the second energy storage device when the energy storage level of the first energy storage device is above a first threshold energy storage level and an energy storage level of the second energy storage device is below a second threshold energy storage level,
the second energy storage device disposed within a second housing, the first housing having an interface, the second housing having a latch, the latch configured to be releasably coupled to the interface such that the first energy storage device is operatively coupled to the second energy storage device.

* * * * *